(12) United States Patent
Hirose et al.

(10) Patent No.: US 8,998,495 B2
(45) Date of Patent: Apr. 7, 2015

(54) SLIDING BEARING

(75) Inventors: Kazuo Hirose, Mie (JP); Seiichi Takada, Mie (JP); Atsushi Morooka, Mie (JP); Ikuma Fujitsuka, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/002,443

(22) PCT Filed: Feb. 23, 2012

(86) PCT No.: PCT/JP2012/054405
§ 371 (c)(1),
(2), (4) Date: Aug. 30, 2013

(87) PCT Pub. No.: WO2012/117938
PCT Pub. Date: Sep. 7, 2012

(65) Prior Publication Data
US 2013/0336607 A1 Dec. 19, 2013

(30) Foreign Application Priority Data

Mar. 1, 2011 (JP) .................................. 2011-044170
Jul. 29, 2011 (JP) .................................. 2011-166933

(51) Int. Cl.
*F16C 33/10* (2006.01)
*F16C 33/24* (2006.01)
(Continued)

(52) U.S. Cl.
CPC ................ *F16C 17/02* (2013.01); *F16C 33/103* (2013.01); *G03G 15/751* (2013.01);
(Continued)

(58) Field of Classification Search
CPC ....... F16C 17/02; F16C 33/1095; F16C 33/20
USPC ......... 384/192, 213, 276, 282, 286, 297, 300, 384/416–419
See application file for complete search history.

(56) References Cited

U.S. PATENT DOCUMENTS 3,162,930 A 12/1964 Litsky
6,729,763 B2 * 5/2004 Post et al. ..................... 384/213
(Continued)

FOREIGN PATENT DOCUMENTS

DE 102007038494 A1 2/2009
DE 102009037262 A1 2/2011
(Continued)

OTHER PUBLICATIONS

International Search Report for PCT/JP2012/054405 dated May 22, 2012.
(Continued)

*Primary Examiner* — Phillip A Johnson
(74) *Attorney, Agent, or Firm* — Hedman & Costigan, P.C.; James V. Costigan; Kathleen A. Costigan

(57) ABSTRACT

It is an object of the present invention to provide a sliding bearing which has a simple construction and thus can be produced easily and at a low cost and yet eliminates the need for the use of a heat insulation sleeve and the like and is capable of maintaining a frictional torque to a low extent. A sliding bearing (1) has an inner ring (2), an outer ring (3), and a sliding contact member (4) interposed therebetween. The inner ring (2) has a curved surface (2a) formed along an outer circumference thereof and a shaft-receiving hole which fits on a supporting shaft along an inner circumference thereof. The sliding contact member (4) is a molded body, made of resin composition, which has a curved surface (4a) making sliding contact with the curved outer circumferential surface (2a) of the inner ring (2) with the curved surface (4a) being opposed to the curved outer circumferential surface (2a). The outer ring (3) does not contact the inner ring (2) and holds the sliding contact member (4) on an inner circumferential side thereof with the outer ring (3) covering the sliding contact member (4). The outer ring (3) has an open portion (3d) formed on an axial one end surface thereof and a pawl portion (3a) formed at an edge of the open portion (3d). The sliding contact member (4) is combined with the outer ring (3) by inserting the sliding contact member (4) into the outer ring (3) from the open portion (3d) thereof and fixed by the pawl portion (3a).

19 Claims, 20 Drawing Sheets

(51) Int. Cl.
  *F16C 17/02* (2006.01)
  *G03G 15/00* (2006.01)
  *G03G 15/20* (2006.01)
  *G03G 21/16* (2006.01)
  *F16C 23/04* (2006.01)
  *F16C 33/20* (2006.01)

(52) U.S. Cl.
  CPC ....... *G03G 15/2053* (2013.01); *G03G 21/1647* (2013.01); *G03G 21/1685* (2013.01); *F16C 23/043* (2013.01); *F16C 33/201* (2013.01)

(56) References Cited

U.S. PATENT DOCUMENTS

2004/0022465 A1   2/2004   Fish
2004/0224859 A1*  11/2004  Numazawa et al. .......... 508/364
2009/0016656 A1*  1/2009   Blair et al. ................... 384/286
2009/0270292 A1*  10/2009  Nonaka et al. ............... 508/416
2011/0221153 A1   9/2011   Bladt

FOREIGN PATENT DOCUMENTS

| | | |
|---|---|---|
| JP | 02-130419 U | 10/1990 |
| JP | 05-098034 A | 4/1993 |
| JP | 05-117678 A | 5/1993 |
| JP | 09-184513 A | 7/1997 |
| JP | 10-331843 A | 12/1998 |
| JP | 2001-158855 A | 6/2001 |
| JP | 2002-188641 A | 7/2002 |
| JP | 2002-310157 A | 10/2002 |
| JP | 2004-053589 A | 2/2004 |
| JP | 2007-100905 A | 4/2007 |
| JP | 2008-002522 A | 1/2008 |
| JP | 2010-270842 A | 12/2010 |

OTHER PUBLICATIONS

Supplementary European Search Report in Corresponding European Application Dated Oct. 30, 2014.

* cited by examiner

SLIDING BEARING

TECHNICAL FIELD

The present invention relates to a sliding bearing. More particularly, the present invention relates to a sliding bearing for supporting rollers (roller to be heated) such as a fixing roller and a pressure roller of a fixing device of an image-forming apparatus such as a copying machine, a printer, a facsimile, and the like.

In the fixing device of the image-forming apparatus, toner is attached to an electrostatic latent image formed by an optical device. Thereafter a toner image is transferred to a sheet of copying paper and fixed thereto. At a fixing process, the toner image is passed between the fixing roller and the pressure roller both of which incorporate a heater. Thereby a transfer image consisting of the toner image is fixed to the copying paper by thermal fusion.

The fixing roller is made of a soft metal and incorporates a linear or bar-like heater in its shaft center portion. The fixing roller is cylindrical and has a small-diameter shaft projected from both ends thereof. The fixing roller is made of a metal material such as aluminum or an aluminum alloy (A5056, A6063) excellent in its thermal conductivity. The surface finish of the fixing roller is performed by turning or polishing. The surface of the fixing roller is coated or covered with a highly unadhesive resin such as fluororesin. The temperature of the surface of the fixing roller is heated to about 180 to 250° C.

The pressure roller is made of an iron material or a soft material both coated with silicone rubber or the like and is rotated with copying paper being pressed against the fixing roller. The pressure roller is heated to 70 to 150° C. by heat transferred from a heating roller. Alternatively, similarly to the fixing roller, the pressure roller is heated up to 150 to 250° C. by a heater mounted inside it. Rollers such as the fixing roller, the pressure roller, and the like to be heated by a heater accommodated therein or by heat transferred from other members are hereinafter referred to as "heat roller".

The heat roller which is heated to a high temperature is rotatably supported at both ends of its shaft by a housing through ball bearings consisting of a deep groove ball bearing. A heat insulation sleeve made of synthetic resin or the like is interposed between each ball bearing and the shaft of the heat roller. This construction is to prevent the temperature distribution along the axial direction of the heat roller from becoming nonuniform and the ball bearing from being deteriorated at a high temperature owing to the escape of heat from the ball bearing disposed at both ends of shaft of the heat roller when the heat roller is heated.

It is known that as a bearing for supporting the heat roller, a sliding bearing made of resin is used in dependence on types of the heat roller. The sliding bearing is formed of a synthetic resin such as polyphenylene sulfide (PPS), polyamide (PA), polyamideimide (PAI), polyimide (PI) or polyether ether ketone (PEEK). As an example, in a known art (see patent document 1), the ring-shaped bearing body is made of the PPS resin excellent in its heat resistance and mechanical strength, and a fluororesin layer is bonded to the sliding contact surface of the bearing body or the sliding bearing is formed by integrally molding the PPS resin to which the fluororesin has been added.

In the case where the sliding bearing made of resin is used, the heat insulation sleeve is not interposed between the sliding bearing made of resin and the shaft of the heat roller because the sliding bearing made of resin has thermal insulation properties. Normally, in the fixing device of middle-class and high-class image-forming apparatuses, the ball bearing is used for the heat roller thereof, whereas in the fixing device of an image-forming apparatus in wide use, the sliding bearing made of resin is used for the heat roller thereof.

PRIOR ART DOCUMENT

Patent Document

Patent document 1: Japanese Patent Application Laid-Open No. H05-117678

SUMMARY OF THE INVENTION

Problems to be Solved by the Invention

The deep groove ball bearing for the heat roller of the fixing device of the image-forming apparatus is complicated in its construction and the cost for producing it is high. In addition, to prevent the temperature distribution along the axial direction of the heat roller from becoming nonuniform and the bearing from being deteriorated at high temperatures, it is necessary to provide the bearing with the heat insulation sleeve. Thus the deep groove ball bearing is expensive. Further there is a fear that the bearing is damaged owing to flexure of the supporting shaft of the heat roller caused by precision error in mounting the supporting shaft of the heat roller on the image-forming apparatus and a moment load.

On the other hand, the sliding bearing made of resin such as the PPS resin can be used without interposing the heat insulation sleeve between the shaft of the heat roller and the ball bearing, has a simple construction, and can be formed by injection molding. Therefore the sliding bearing made of resin has an advantage that it can be produced at a low cost. But the frictional torque to be applied to the sliding bearing made of resin two to five times higher than that to be applied to the deep groove ball bearing. When the sliding contact surface of the bearing of the heat roller has a high degree of roughness, a higher frictional torque is applied to the sliding bearing made of resin and at the same time, the sliding bearing made of resin is subjected to a high degree of wear. Thus there is a fear that the specification is not satisfied.

Even though grease is applied to the sliding contact surface of the bearing to decrease the frictional torque, the grease becomes short at a portion where a load is applied to a high extent. Thus there is a fear that the specification is not satisfied.

In a sliding bearing which has an inner ring, an outer ring, and a sliding contact member interposed therebetween, there is a fear that the sliding contact member holds the inner ring with the sliding contact surface of the former in close contact with that of the latter. Thus the sliding bearing has a high coefficient of friction between the sliding contact member and the inner ring. The reason the sliding contact member holds the inner ring with the sliding contact surface of the former in close contact with that of the latter is as follows: The sliding bearing is routinely used in the form in which an atmospheric temperature rises owing to the operation of a device, and thus the sliding bearing is heated and thereafter cooled owing to the stop of the operation thereof. Because the sliding contact member contracts after it thermally expands, the butting portion thereof becomes narrow. As a result, the sliding contact member holds the inner ring with the sliding contact surface of the former in close contact with that of the latter. Because the sliding contact member holds the inner ring with the sliding contact surface of the former in close contact with that of the latter, the sliding bearing has a high coefficient of friction between the sliding contact member and the inner ring. In addition, because grease is pressed out of the sliding contact surfaces, the sliding bearing has a higher coefficient of friction between the sliding contact member and the inner ring. Thus there is a fear that the sliding bearing is subjected to wear.

The present invention has been made to deal with the above-described problems. Therefore it is an object of the present invention to provide a sliding bearing which has a simple construction and thus can be produced easily and at a low cost and yet eliminates the need for the use of a heat insulation sleeve and the like and is capable of maintaining a frictional torque to a low extent. It is another object of the present invention to provide a sliding bearing capable of preventing the rise of its coefficient of friction and the generation of friction caused by a phenomenon that a sliding contact member holds an inner ring with the sliding contact surface of the former in close contact with that of the latter.

Means for Solving the Problems

The sliding bearing of the present invention has an inner ring, an outer ring, and a sliding contact member interposed therebetween, wherein the inner ring has a curved surface formed along an outer circumference thereof and a shaft-receiving hole which fits on a supporting shaft along an inner circumference thereof; the sliding contact member is a molded body, made of a resin composition, which has a curved surface making sliding contact with the curved outer circumferential surface of the inner ring with the curved surface of the sliding contact member being opposed to the curved outer circumferential surface of the inner ring; and the outer ring does not contact the inner ring and holds the sliding contact member on an inner circumferential side thereof with the outer ring covering the sliding contact member.

The sliding contact member is an annular body having one butting portion.

The outer ring has a projection on an inner circumferential surface thereof; and the projection is fitted on the butting portion of the sliding contact member. The annular body is so constructed that at one side of the annular body in an axial direction thereof, the butting portion has an abutting surface disposed on a sectional surface of each of both end portions of the annular body; and at other side of the annular body in the axial direction thereof, the butting portion has a stepped portion on which the projection of the outer ring fits on the sectional surface of at least one of the both end portions of the annular body.

A circumferential length of a fit-on portion, consisting of the stepped portions, on which the projection of the outer ring fits is set longer than a circumferential length of the projection of the outer ring. A length of a gap between the abutting surfaces is set shorter than a length of a gap between a fit-on portion, consisting of the stepped portions, and the projection of the outer ring. A length of the gap between the abutting surfaces before the sliding contact member is combined with the outer ring is set equally to the length of the gap between the abutting surfaces after the sliding contact member is combined with the outer ring.

A base resin of a resin composition forming the sliding contact member is at least one synthetic resin selected from among polyphenylene sulfide resin, polyether ether ketone resin, polyamideimide resin, and polyimide resin.

The resin composition forming the sliding contact member contains at least one substance selected from among a solid lubricant and a fibrous reinforcing material. The solid lubricant is at least one substance selected from among polytetrafluoroethylene resin, graphite, and molybdenum disulfide. The fibrous reinforcing material is at least one fiber selected from among carbon fibers and aramid fibers.

The outer ring has an open portion formed on an axial one end surface thereof and a pawl portion formed at an edge of the open portion; and the sliding contact member is combined with the outer ring by inserting the sliding contact member into the outer ring from the open portion thereof and fixed by the pawl portion.

The outer ring is a molded body of a resin composition. A base resin of a resin composition forming the sliding contact member is at least one synthetic resin selected from among polyphenylene sulfide resin, polyether ether ketone resin, polyamideimide resin, and polyimide resin. The resin composition forming the outer ring contains a fibrous reinforcing material; and the fibrous reinforcing material is at least one selected from among carbon fibers; glass fibers, and aramid fibers.

The outer ring has a flange formed along an outer circumference thereof.

At least one lubricant selected from among fluorine grease and urea grease is applied to a sliding contact surface of the inner ring and that of the sliding contact member. A lubricant-holding pocket is formed on a sliding contact surface of the sliding contact member.

The curved outer circumferential surface of the inner ring is formed as a concave curved surface; and the curved surface of the sliding contact member is formed as a convex curved surface. A non-curved surface portion is formed along an entire circumference of a central portion of the convex curved surface of the sliding contact member in an axial direction thereof. The sliding contact member is an injection-molded body of the resin composition; and a parting line is formed on the non-curved surface portion when the resin composition is injection-molded.

An inner ring for a ball bearing is used as the inner ring.

Effect of the Invention

The sliding bearing of the present invention has the inner ring, the outer ring, and the sliding contact member interposed therebetween, wherein the inner ring has the curved surface formed along the outer circumference thereof and the shaft-receiving hole which fits on the supporting shaft along the inner circumference thereof; the sliding contact member is the molded body, made of the resin composition, which has the curved surface making sliding contact with the curved outer circumferential surface of the inner ring with the curved surface of the sliding contact member being opposed to the curved surface of the inner ring; and the outer ring does not contact the inner ring and holds the sliding contact member on the inner circumferential side thereof with the outer ring covering the sliding contact member. Therefore the sliding bearing is constructed of a smaller number of parts than a ball bearing and thus has a simpler construction than the ball bearing. Thus it is possible to easily produce the sliding bearing and shorten the process of producing the sliding bearing and the period of time in which the sliding bearing is assembled. Thereby it is possible to provide the sliding bearing at a low cost. In addition, because the sliding contact member interposed between the inner ring and the outer ring which does not contact the inner ring is a molded body made of the resin composition, the sliding contact member has a self-thermal insulation effectiveness the ball bearing does not have. Thus it is unnecessary to provide the sliding bearing with a heat insulation sleeve.

The sliding bearing has the form in which the curved outer circumferential surface of the inner ring makes sliding contact with the curved surface of the annular sliding contact member with the curved outer circumferential surface of the inner ring and the curved surface of the sliding contact member being opposed to each other. Therefore unlike a sliding bearing, made of resin, which makes sliding contact with the supporting shaft with which the sliding contact member mates, the frictional torque does not depend on the surface roughness of the supporting shaft and the material thereof. The sliding bearing has the form in which the inner and outer rings do not contact each other. This form allows the frictional torque to be applied to the sliding bearing of the present invention to be lower than that to be applied to the conventional sliding bearing, made of resin, which has the above-described form. Therefore the sliding bearing of the present invention has a property intermediate between that of the ball bearing and that of the conventional sliding bearing made of resin in its frictional torque and the production cost.

Because the sliding contact member of the present invention is the annular body having one butting portion, the sliding contact member can be easily combined with the inner ring. In addition, it is possible to prevent the sliding contact member from being broken owing to a stress concentration caused by its thermal expansion.

The outer ring has the projection on the inner circumferential surface thereof. The projection is fitted on the butting portion of the sliding contact member. Therefore the sliding contact member does not rotate relative to the outer ring and thus the rotation torque of the sliding bearing is stable. Further the sliding contact member does not hold the inner ring with the sliding contact surface of the former in close contact with that of the latter. Thus it is possible to prevent the rotation torque and friction coefficient of the sliding bearing from increasing and wear from being generated.

The annular body is so constructed that at one side of the annular body in the axial direction thereof, the butting portion has the abutting surface disposed on the sectional surface of each of both end portions of the annular body; and at other side of the annular body in the axial direction thereof, the butting portion has the stepped portion on which the projection of the outer ring fits on the sectional surface of at least one of both end portions of the annular body. The circumferential length of the fit-on portion, consisting of the stepped portions, on which the projection of the outer ring fits is set longer than the circumferential length of the projection of the outer ring. Therefore the sliding bearing is excellent in combining its annular body with its outer ring.

The length of the gap between the abutting surfaces is set shorter than the length of the gap between the fit-on portion, consisting of the stepped portions, and the projection of the outer ring. Therefore when the developed length of the sliding contact member is extended owing to its expansion caused by heating, the gap between the abutting surfaces of the butting portion is closed earlier than the gap between the fit-on portion and the projection of the outer ring. Thus it is possible to prevent the sliding contact member from holding the inner ring with the sliding contact surface of the former in close contact with that of the latter.

The length of the gap between the abutting surfaces before the sliding contact member is combined with the outer ring is set equally to the length of the gap between the abutting surfaces after the sliding contact member is combined with the outer ring. This construction does not adversely affect the rotation torque of the sliding bearing.

Because the outer ring is the molded body of the resin composition, the sliding bearing is allowed to be lightweight and excellent in its heat insulation.

The outer ring has the open portion formed on the axial one end surface thereof and the pawl portion formed at the edge of the open portion. The sliding contact member is combined with the outer ring by inserting the sliding contact member thereinto from the open portion thereof and fixed by the pawl portion. Therefore it is possible to produce the sliding bearing easily by combining the sliding contact member with the outer ring by snap fit. This construction allows the sliding contact member to be held inside the outer ring and combined therewith. The snap-fittable construction makes it possible to shorten the process of producing the sliding bearing and the period of time in which the sliding bearing is assembled. Thereby it is possible to provide the sliding bearing at a low cost.

The base resin of the resin composition forming the sliding contact member or the outer ring is at least one synthetic resin selected from among PPS resin, PEEK resin, PAI resin, and PI resin. Therefore the sliding contact member or the outer ring is excellent in the heat resistance thereof and thus can be used up to about 200° C. Thus the sliding bearing of the present invention can be preferably used as the shaft for supporting the heat roller.

Because the resin composition forming the sliding contact member contains the solid lubricant, a frictional torque is decreasingly applied to the sliding bearing. The fibrous reinforcing agent contained in the resin composition forming the sliding contact member reinforces the sliding contact member or the like and allows the sliding contact member to have a high wear resistance. In addition, because the fibrous reinforcing material allows the sliding contact member to have a high elasticity, the sliding contact member can be used at a high temperature environment.

The solid lubricant is at least one substance selected from among PTFE resin, graphite, and molybdenum disulfide. The use of the solid lubricant for the sliding contact member allows it to have an excellent lubricating property and a stable frictional torque. The fibrous reinforcing material which can be used for the sliding contact member is at least one fiber selected from among carbon fibers and aramid fibers. The use of these fibers for the sliding contact member restrains the inner ring which mates the sliding contact member from wearing. The use of these fibers for the sliding contact member is also capable of enhancing the wear resistance thereof and the retention property of the elastic modulus thereof at high temperatures. Because the fibrous reinforcing agent which can be used for the outer ring is at least one fiber selected from among carbon fibers, glass fibers, and aramid fibers, the constructive strength of the outer ring can be enhanced.

The outer ring has the flange formed along the outer circumference thereof. Thus the flange can be used as a positioning member for axially disposing the outer ring inside a device such a fixing device. The flange is excellent in combining the sliding contact member with the outer ring.

By applying the lubricant to the sliding contact surface of the inner ring and that of the sliding contact member, it is possible to allow the frictional torque to be decreasingly applied thereto, prevent the sliding contact member from seizing, and significantly lengthen the life of the performance thereof. By using at least one grease selected from among fluorine grease and urea grease as the lubricant for the resin composition, the inner ring and the sliding contact member are allowed to have a stable lubricating property and a low frictional torque at high temperatures. By forming the lubricant-holding pocket on the sliding contact surface of the sliding contact member, the lubricant can be stably supplied to the sliding contact surface.

The curved outer circumferential surface of the inner ring is formed as the concave curved surface. The curved surface of the sliding contact member is formed as the convex curved surface which slidingly contacts the concave curved surface with the convex curved surface being opposed to the concave curved surface. Therefore it is possible to prevent the inner and outer rings from being axially dislocated. The non-curved surface portion is formed along the entire circumference of the central portion of the convex curved surface of the sliding contact member in the axial direction thereof. Therefore the lubricant can be held in the non-curved surface portion. The sliding contact member is an injection-molded body of the resin composition. The parting line is formed on the non-curved surface portion when the resin composition is injection-molded. Therefore the sliding contact member can be easily produced by injection-molding the resin composition, and the convex parting line does not interfere with the sliding contact surface of the inner ring.

Because an inner ring for a ball bearing is utilized as the inner ring of the present invention, the curved outer circumferential surface of the inner ring which makes sliding contact with the sliding contact surface of the sliding contact member is the rolling contact surface of the inner ring and is formed highly accurately, which allows the inner ring to have stable rotational performance.

MODE FOR CARRYING OUT THE INVENTION

Figure 1:
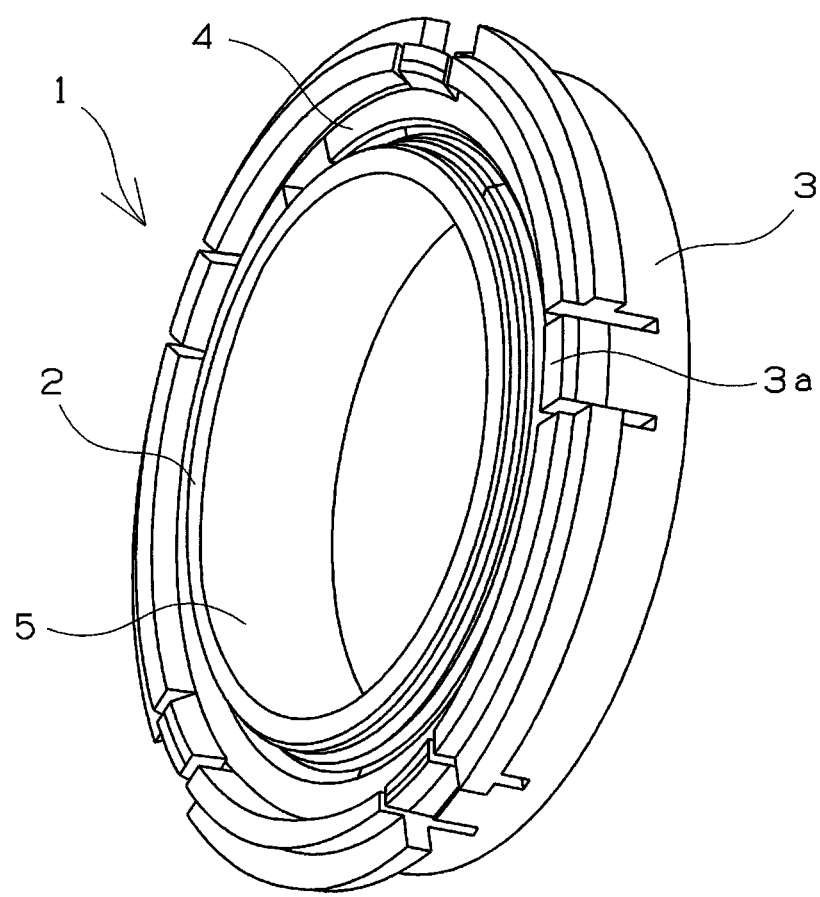
FIG. 1 is a perspective view showing one example of a sliding bearing of the present invention.
Figure 2:
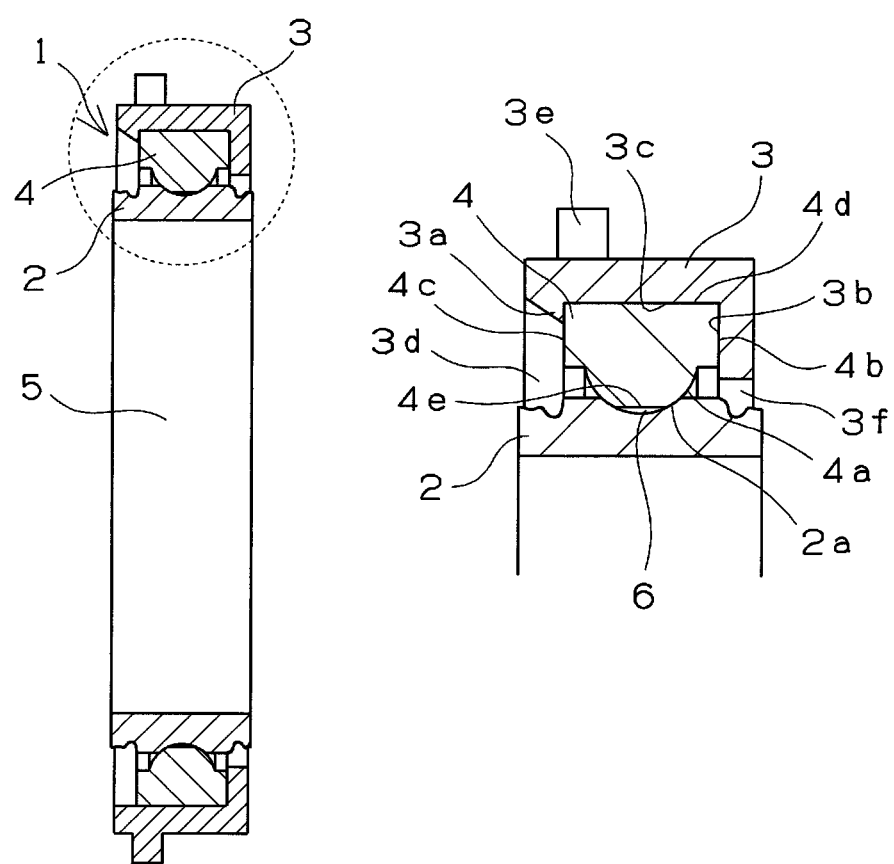
FIG. 2 is a sectional view of the sliding bearing in an axial direction thereof.

One embodiment of the sliding bearing of the present invention is described below with reference to FIGS. 1 and 2. FIG. 1 is a perspective view of a sliding bearing of one embodiment of the present invention. FIG. 2 is an axial sectional view of the sliding bearing and a partly enlarged sectional view thereof. As shown in FIGS. 1 and 2, a sliding bearing 1 has an inner ring 2, an outer ring 3, and a sliding contact member 4 interposed between the inner ring 2 and the outer ring 3. The sliding bearing 1 is a radial bearing. As shown in FIG. 2, the inner ring 2 has a curved surface 2a formed along its outer circumference and a shaft-receiving hole 5 which fits on a supporting shaft along its inner circumference. The sliding contact member 4 has a curved surface 4a which slidingly contacts the curved surface 2a with the curved surface 4a being opposed to the curved outer circumferential surface 2a of the inner ring 2. The outer ring 3 consists of one member and holds the sliding contact member 4 on its inner circumferential side with the outer ring 3 covering the sliding contact member 4. There is a gap 3f formed between the inner ring 2 and the outer ring 3 so that both members 2 and 3 do not contact each other. The sliding contact member 4 is held in a space surrounded with a plurality of pawl portions 3a formed at the edge of an open portion 3d provided along one end surface of the outer ring 3, an inner circumferential surface 3c of the outer ring 3, and an end surface side inner surface 3b of the outer ring 3. More specifically, one end surface 4b of the sliding contact member 4 contacts the end surface side inner surface 3b of the outer ring 3. An outer circumferential surface 4d of the sliding contact member 4 contacts the inner circumferential surface 3c of the outer ring 3. Other end surface 4c of the sliding contact member 4 is caught by the pawl portions 3a of the outer ring 3 and fixed thereto. In this manner, the sliding contact member 4 is held by the outer ring 3.

Figure 3:
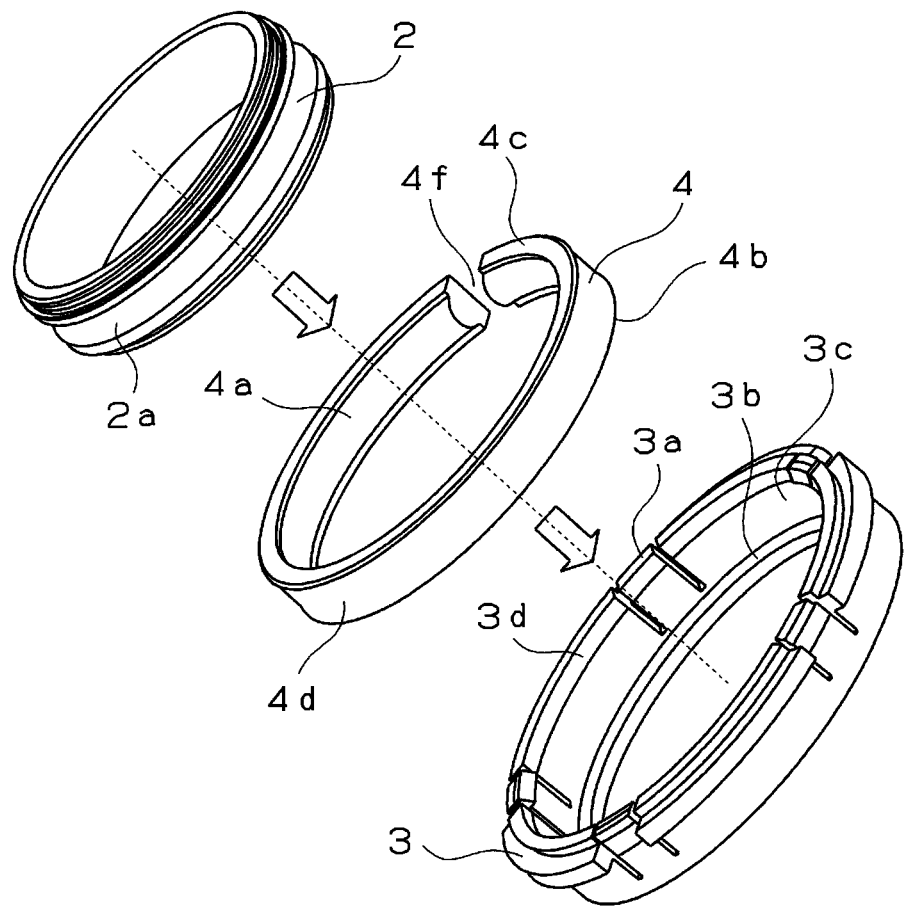
FIG. 3 shows an assembling process of the sliding bearing of the present invention.
Figure 3:
Figure 3:
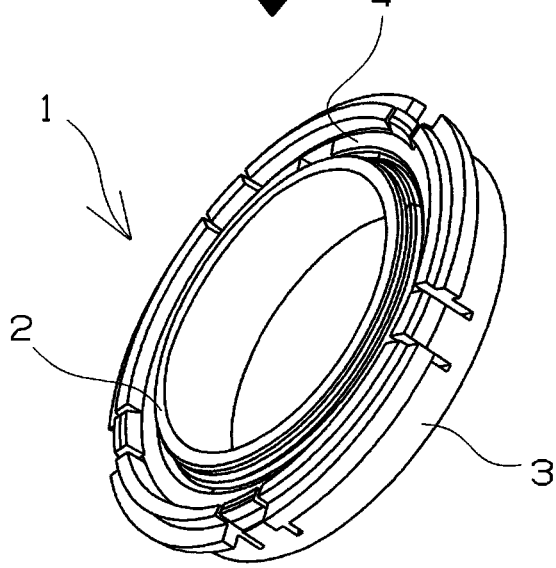

FIG. 3 shows the assembling process of the sliding bearing 1. In the assembling sequence, initially the sliding contact member 4 is fitted on the inner ring 2 by an elastic deformation of the sliding contact member 4 to allow the curved outer circumferential surface 2a of the inner ring 2 to contact the curved surface 4a of the sliding contact member 4 with the curved surface 2a being opposed to the curved surface 4a. Thereafter the combined member consisting of the sliding contact member 4 and the inner ring 2 is combined with the outer ring 3 by inserting the combined member from the open portion 3d thereof. The combined member is pressed into the outer ring 3 until the one end surface 4b of the sliding contact member 4 contacts the end surface side inner surface 3b of the outer ring 3 with a plurality of the pawl portions 3a formed at the edge of the open portion 3d of the outer ring 3 being elastically extended. When the combined member is pressed to the above-described position, the other end surface 4c thereof is caught by a plurality of the pawl portions 3a.

Thereby the sliding contact member 4 is held by the outer ring 3. By performing the above-described assembling operations, it is possible to obtain the sliding bearing 1 composed of the inner ring 2, the outer ring 3, and the sliding contact member 4 combined with one another. A series of the assembling operations can be accomplished by snap fit. In the case where a lubricant such as grease is applied to a sliding contact surface of the inner ring 2 and that of the sliding contact member 4, it is preferable to apply the lubricant thereto in advance before combining the sliding contact member 4 with the inner ring 2.

Figure 4:
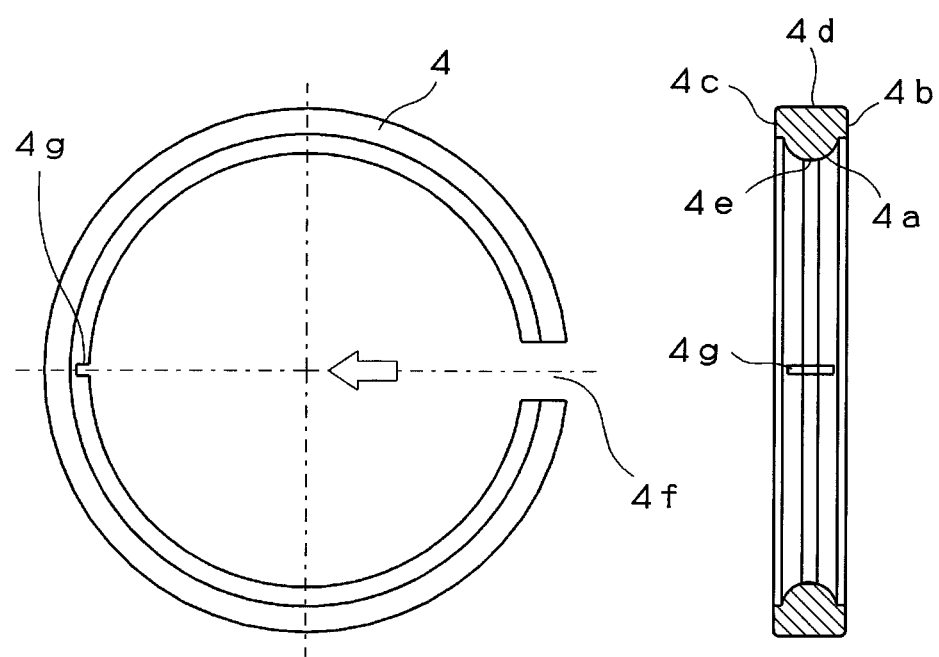
FIG. 4 is a front view of a sliding contact member of the sliding bearing shown in FIG. 1 and a sectional view thereof in its axial direction.

FIG. 4 shows a front view of the sliding contact member 4 and a sectional view thereof in its axial direction (direction shown by the arrow in FIG. 4). As shown in FIGS. 2 and 4, the sliding contact member 4 is an annular body having the curved surface 4a which contacts the curved outer circumferential surface 2a of the inner ring 2 with the curved surface 4a being opposed to the curved outer circumferential surface 2a. The outer circumferential surface 4d (a straight line in the axial sectional view of the sliding contact member 4) of the sliding contact member 4 is brought into contact with the inner circumferential surface 3c of the outer ring 3 to prevent the sliding contact member 4 from being circumferentially dislocated, namely, to hold the sliding contact member 4 at the inner circumferential side of the outer ring 3. The one end surface 4b of the sliding contact member 4 is formed as a plain surface which contacts the end surface side inner surface 3b of the outer ring 3 to hold the sliding contact member 4 inside the outer ring 3 without axially dislocating the sliding contact member 4. The other end surface 4c of the sliding contact member 4 is a plain surface parallel with the one end surface 4b thereof.

As shown in FIG. 4, it is preferable to form the sliding contact member 4 as an annular body having one butting portion 4f. The sliding contact member 4 is made of resin. Thus in the case where the inner ring 2 and the outer ring 3 are made of a metal, the linear coefficient of expansion of the sliding contact member 4 is different from those of the inner ring 2 and the outer ring 3. Even in this case, by forming the butting portion 4f on the sliding contact member 4, it is possible to escape a thermal expansion thereof to the butting portion 4f when temperature is high. Therefore it is possible to prevent the sliding contact member 4 from being broken by a stress concentration. In combining the sliding contact member 4 with the inner ring 2 by the elastic deformation of the sliding contact member 4, the butting portion 4f expands. Thus the sliding contact member 4 is excellent in the performance of combining the sliding contact member 4 with the inner ring 2. As other forms of the sliding contact member 4, it is possible to form a plurality of butting portions (disconnected portions) similar to the above-described butting portion 4 on the annular sliding contact member 4 by disposing them thereon at equal intervals in the circumferential direction thereof. The effect to be brought about by this form is similar to the above-described effect.

The sliding contact member 4 is a molded body of a resin composition. Although the kind of a synthetic resin forming the base resin of the resin composition is not limited to a specific one, it is necessary to use a synthetic resin essentially having a characteristic feature which meets the use condition (heat resistance, mechanical strength, and the like) of the sliding bearing. An injection-moldable synthetic resin is preferable because it can be easily processed into the sliding contact members 4 having a uniform dimension.

As synthetic resins which form the base resin of the resin composition forming the sliding contact member 4, it is possible to list polyamide (PA) resin such as polyamide 6 (PA6) resin, polyamide 6-6 (PA66) resin, polyamide 6-10 (PA610) resin, polyamide 6-12 (PA612) resin, polyamide 4-6 (PA46) resin, polyamide 9-T (PA9T) resin, polyamide 9-T (PA9T) resin, polyamide 6-T (PA6T) resin, polymethaxylene adipamide polyamideMXD-6) resin; injection-moldable fluororesin such as polytetrafluoroethylene-perfluoroalkyl vinyl ether copolymer (PFA) resin, tetrafluoroethylene-hexafluoropropylene copolymer (FEP) resin, and an ethylene-tetrafluoroethylene copolymer (ETFE) resin; polyacetal (POM) resin; wholly aromatic polyester resin; PPS resin, PEEK resin, PAI resin, and injection-moldable PI resin. In each polyamide resin, numerals indicate carbon numbers between amide bonds, and T indicates terephthalic acid residue. It is possible to use these synthetic resins singly or as a polymer alloy formed by mixing not less than two kinds thereof.

Of these synthetic resins, it is preferable to use at least one synthetic resin selected from among the PPS resin, the PEEK resin, the PAI resin, and the PI resin because these synthetic resins are excellent in the heat resistance thereof and can be used at temperatures up to about 200° C. The sliding contact member formed by molding these resins can be preferably used for a sliding bearing supporting a heat roller such as a fixing roller which is used for an image-forming apparatus at high temperatures.

The resin composition forming the sliding contact member 4 is capable of containing a fibrous reinforcing material such as carbon fibers, aramid fibers, and glass fibers. These fibrous reinforcing materials can be added to the base resin singly or in combination of not less than two kinds thereof. The sliding contact member consisting of the resin composition containing these fibrous reinforcing materials is reinforced thereby and allowed to have a high wear resistance. In addition, because the fibrous reinforcing material allows the sliding contact member to have a high elasticity, the sliding contact member can be used at a high temperature environment.

Of these fibrous reinforcing materials, it is preferable to use at least one fibrous reinforcing material selected from among the carbon fibers and the aramid fibers. The use of these fibrous reinforcing materials for the sliding contact member maintains the reinforcing effect to be brought about thereby and restrains the wear of the inner ring which mates with the sliding contact member. Further the use of these fibrous reinforcing materials for the sliding contact member enhances the wear resistance thereof and the elastic modulus retention performance thereof at high temperatures.

The resin composition forming the sliding contact member 4 is capable of containing the powder of a solid lubricant such as PTFE resin, graphite, molybdenum disulfide, polyimide resin, phenol resin, and wholly aromatic polyester resin. The resin composition is capable of containing one of these solid lubricants or not less than two kinds thereof. The resin composition containing these solid lubricants is allowed to have a low friction torque.

Of these solid lubricants, it is preferable to use at least one solid lubricant selected from among the powder of the PTFE resin, the graphite, and the molybdenum disulfide. The use of these solid lubricants for the sliding contact member allows the sliding contact member to have an excellent lubricating property and the frictional torque to be stably applied thereto. Additives other than the fibrous reinforcing material and the solid lubricant may be added to the base resin of the resin composition forming the sliding contact member 4 as necessary.

Figure 5:
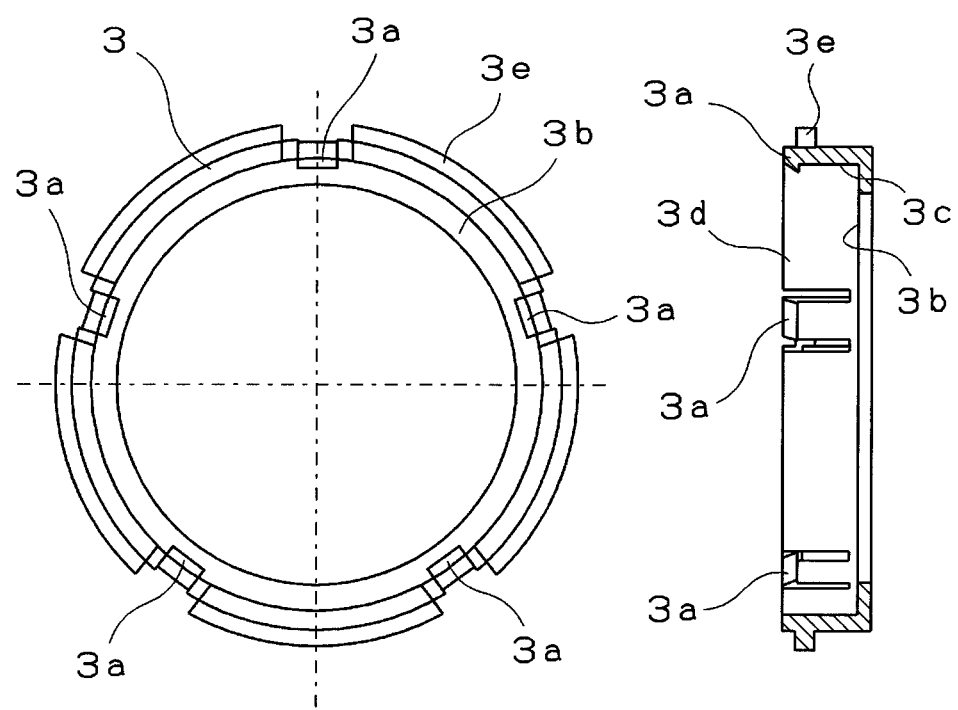
FIG. 5 is a front view of an outer ring of the sliding bearing shown in FIG. 1 and a sectional view thereof in its axial direction.

FIG. 5 shows a front view of the outer ring 3 and an axial sectional view thereof. As shown in FIGS. 2 and 5, the outer ring 3 consists of one member and holds the sliding contact member 4 on its inner circumferential side with the outer ring 3 covering the sliding contact member 4. The outer ring 3 has a flange 3e on its outer circumference. The flange 3e serves as a member for axially positioning the outer ring 3 inside a device such as a fixing device. By disposing the flange 3e at the side of the open portion 3d with respect to the center of the outer ring 3 in its axial direction, it is possible to enhance the mechanical strength of the end portion of the outer ring 3, namely, the open portion side thereof in its axial direction. In addition, the sliding contact member 4 can be favorably combined with the outer ring 3 having the flange 3.

Figure 8:
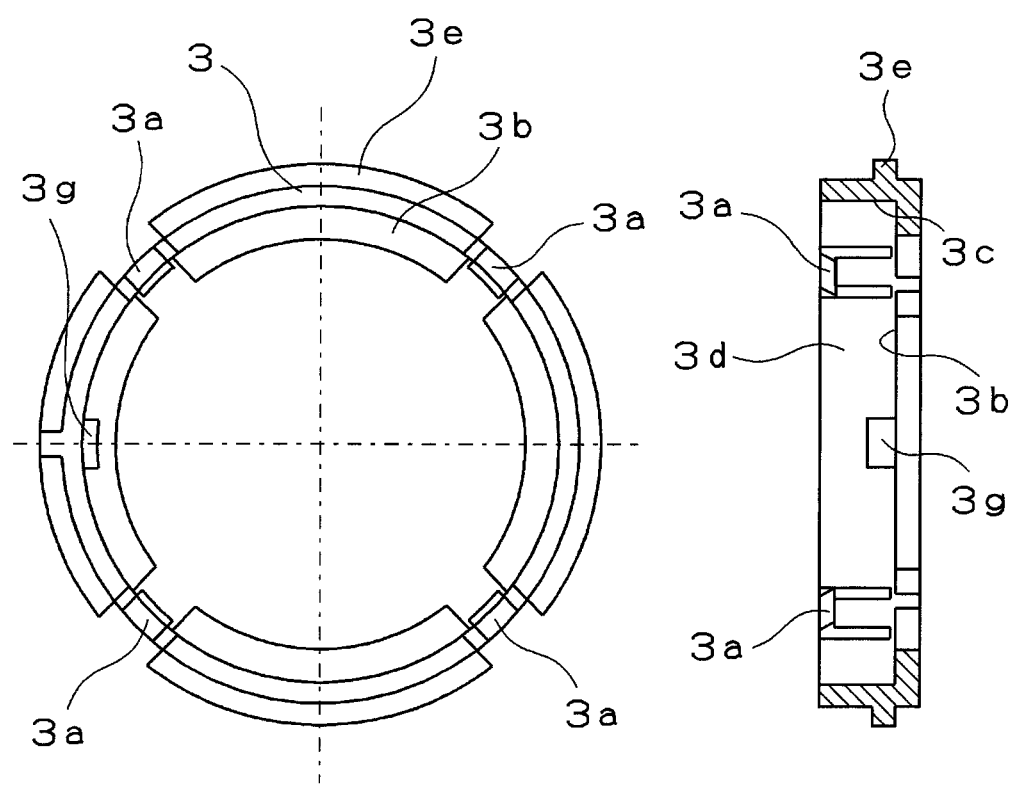
FIG. 8 is a front view of an outer ring having another form and an axial sectional view thereof.

The configuration of the pawl portion 3a formed at the edge of the open portion 3d of the outer ring 3 can be arbitrarily set, provided that the pawl portion 3a is capable of fixedly holding the sliding contact member 4 in using the bearing. As shown in FIGS. 2 and 5, the configuration of the pawl portion 3a can be so set as to form a fit-on construction complementary with the sliding contact member 4. For example, the configuration of the pawl portion 3a can be so set as to have a plain portion which makes a surface contact with the other end surface 4c of the sliding contact member 4 or can be so set as to be fitted on a concave portion formed on the other end surface 4c of the sliding contact member 4 (see FIG. 10). The number of the pawl portions 3a can be arbitrarily set. To stably hold the sliding contact member 4, it is favorable to form the pawl portions 3a at not less than two positions, more favorable to form them at three to six positions, and most favorable to form them at four positions, as shown in FIG. 8 or at five positions, as shown in FIG. 5. In the case where a plurality of the pawl portions 3a is formed on the outer ring 3, it is preferable to dispose them thereon at equal intervals in the circumferential direction thereof.

By so constructing the outer ring 3 that the sliding contact member 4 to be caught by the pawl portion and the outer ring 3 can be combined with each other by snap fit, it is possible to produce the sliding bearing easily (see FIG. 3), shorten the process of producing the sliding bearing and the period of time in which the sliding bearing is assembled. Thereby it is possible to provide the sliding bearing at a low cost. The outer ring 3 may have a construction other than the construction having the pawl portion formed thereon, provided that the outer ring 3 is capable of holding the sliding contact member 4. For example, it is possible to form a complementary fit-on construction on a portion of the sliding contact member 4 and a portion of the outer ring 3 to fixedly fit the sliding contact member 4 on the inner circumferential side of the outer ring 3.

It is preferable that the outer ring 3 has a portion for stopping the rotation of the sliding contact member 4. The rotation-stopping portion holds the sliding contact member 4 unrotatably relative to the outer ring 3. Thus the rotation-stopping portion allows the rotation performance of the outer ring 3 to be stable. As the rotation-stopping portion, as described above, it is possible to form a fit-on construction complementary with the sliding contact member 4 on the pawl portions of the outer ring 3 and other portions thereof so that fit-on construction prevents the sliding contact member 4 from rotating. For example, as shown in FIG. 8, it is possible to form a projection (rotation-stopping portion 3g) which can be fitted on the butting portion 4f of the sliding contact member 4 on a portion of the inner circumferential surface 3c of the outer ring 3. It is preferable to form the rotation-stopping portion 3g at a side opposite to a load-applied side. In FIG. 8 showing the outer ring 3, four pawl portions 3a are formed. It is possible to provide the sliding contact member 4 and the outer ring 3 with a construction having a pin or the like preventing the rotation of the sliding contact member 4 at a portion thereof.

The material of the outer ring 3 is not limited to a specific kind, provided that the material can be processed into the outer ring 3 having a construction for holding the sliding contact member 4, but the outer ring 3 can be made of a synthetic resin or a metal. It is preferable to make the outer ring 3 of the synthetic resin because the synthetic resin makes it easy to produce a complicated construction which allows the snap fit to be accomplished by elastically deforming the pawl portion or the like. As the synthetic resin to be used as the base resin of the resin composition forming the outer ring 3, it is possible to use synthetic resins similar to those for the sliding contact member. Of those, it is preferable to use at least one synthetic resin selected from among the PPS resin, the PEEK resin, the PAI resin, and the PI resin because these synthetic resins are excellent in the heat resistance thereof and can be used at temperatures up to about 200° C.

The resin composition forming the outer ring 3 is capable of containing a fibrous reinforcing material such as carbon fibers, aramid fibers, and glass fibers. These fibrous reinforcing materials can be added to the base resin singly or in combination of not less than two kinds thereof. Because the outer ring consisting of the resin composition containing these fibrous reinforcing materials is reinforced thereby and allowed to have a high elasticity, the outer ring can be used at a high-temperature environment. The resin composition forming the outer ring 3 is capable of containing an extender such as carbon black, calcium carbonate, magnesium carbonate, talc, titanium oxide, silica, silicate, barium sulfate, and mica and other additives as necessary. The extender has the merit of maintaining the structural strength of the resin composition and is capable of contributing to cost reduction.

By using the same kind of the base resin of the resin composition forming the outer ring 3 and the reinforcing material to be added to the base resin as the resin composition forming the sliding contact member 4, it is possible to allow the linear coefficient of expansion of the outer ring 3 and that of the sliding contact member 4 to be approximately equal to each other and thus prevent the outer ring 3 and the sliding contact member 4 from being broken and from being dislocated from each other.

In the case where the outer ring 3 is made of a metal, as a metallic material, it is possible to list an iron-based metallic material such as cold-rolled steel (SPCC), case hardening steel (SCM), hot-rolled steel (SPHC), carbon steel (S25C to S55C), stainless steel (SUS304 to SUS316), and mild steel; a copper-based metallic material such as a copper-zinc alloy, and a copper-aluminum-iron alloy; and an aluminum-based metallic material such as an aluminum-silicon alloy.

Figure 6:
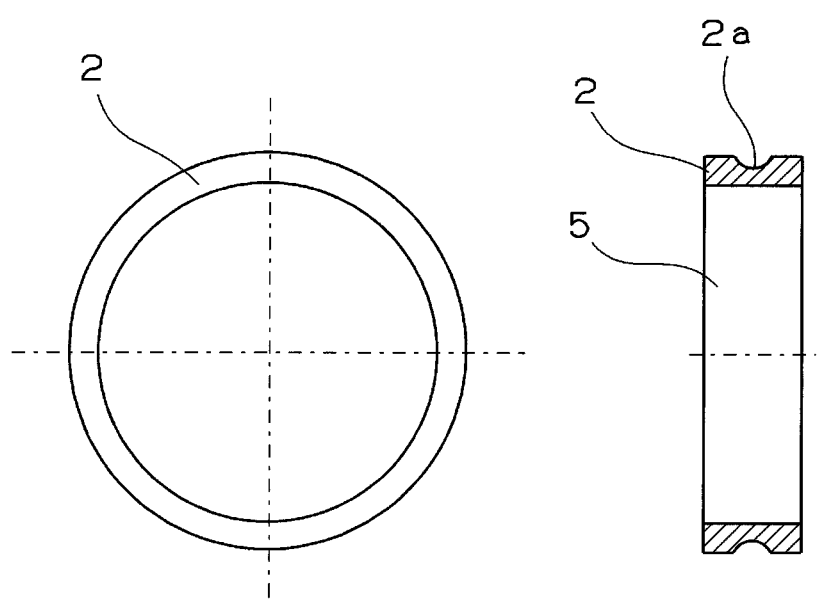
FIG. 6 is a front view of an inner ring of the sliding bearing shown in FIG. 1 and a sectional view thereof in its axial direction.

FIG. 6 shows a front view of the inner ring 2 and an axial sectional view thereof. As shown in FIG. 6, the concave curved surface 2a is formed on the entire outer circumference of the inner ring 2. The curved surface 2a slidingly contacts the sliding contact surface of the sliding contact member 4. The above-described configuration allows an inner ring for a ball bearing such as an existing deep groove ball bearing to be divertingly used as the inner ring 2. In this case, the curved surface 2a which slidingly contacts the sliding contact surface of the sliding contact member 4 is the rolling contact surface of the inner ring of the rolling bearing. Because the curved surface 2a is formed with a high degree of accuracy, the curved surface 2a allows the rotational performance of the inner ring 2 to be stable. In addition, the diversion of the inner ring for the ball bearing to the inner ring of the sliding bearing of the present invention eliminates the need for the production of the inner ring. Thus it is possible to decrease the production cost.

The material of the inner ring 2 is not limited to a specific kind, but the inner ring 2 can be made of a metal or a synthetic resin. As metallic materials of the inner ring 2, those (for example, bearing steel) for the inner ring of ordinary rolling bearings and the above-described ones for the outer ring 3 are listed. As resin materials, the above-described ones for the sliding contact member are listed. It is preferable to make the inner ring 2 of the metal because the metal improves the mechanical strength of the sliding bearing.

It is preferable to make the inner ring 2 of metal forging. By making the inner ring 2 of the metal forging, it is possible to mass-produce the inner ring 2 at a low cost. The inner ring 2 can be made of a sintered metal. By making the inner ring 2 of the sintered metal, it is possible to obtain a high effect in retaining a lubricant applied to the sliding contact surface of the inner ring and that of the sliding contact member. It is preferable to impregnate the sintered metal with lubricating oil. It is possible to maintain the lubricating effect for a long term owing to the lubricating oil impregnated into the sintered metal and the lubricant applied to the sliding contact surfaces. Thus a synergistic effect can be expected. The kind of the sintered metal is not limited to a specific one. For example, it is possible to use Fe-based, Cu-based, Fe—Cu-based, Cu—Sn-based, and Cu—Fe—Sn-based alloys. It is possible to use substances to which carbon, graphite or molybdenum disulfide which have been added to these sintered metal. Of these sintered metals, the sintered metal containing at least one metal selected from among Cu and Fe as its main component is preferable because the sintered metal containing Cu or Fe as its main component is excellent in its heat dissipation, can be easily produced by compression molding, is low in its dimensional change, and can be produced at a low cost.

Based on FIG. 2, the sliding contact surface of the inner ring 2 and that of the sliding contact member 4 are described in detail below. The curved surface 4a of the sliding contact member 4 and the outer circumferential surface 2a of the inner ring 2 are the sliding contact surfaces of the sliding bearing 1. The rotation-stopping portion is formed on the outer ring 3 to hold the sliding contact member 4 unrotatably relative to the outer ring 3. Thereby the sliding contact member 4 rotates together with the outer ring 3 relative to the inner ring 2. Because the gap 3f is formed between the inner ring 2 and the outer ring 3, both members do not contact each other. Thus a direct frictional loss is not generated therebetween.

In the example shown in FIG. 2, the curved outer circumferential surface 2a of the inner ring 2 is concave in its axial section, whereas the curved surface 4a of the sliding contact member 4 is convex in its axial section in correspondence to the curved outer circumferential surface 2a of the inner ring 2. By forming the inner ring 2 and the sliding contact member 4 in a complementary configuration, it is possible to prevent the outer ring 3 as well as the sliding contact member 4 from being axially dislocated from the inner ring 2. By forming the curved surface 4a of the sliding contact member 4 as the convex curved surface, it is possible to utilize an existing inner ring for use in the ball bearing as the inner ring 2, as described above.

In the example of the sliding bearing of the present invention shown in FIG. 2, in the sliding contact member 4, a non-curved surface portion 4e is formed along the entire circumference of a central portion of the curved surface 4a (convex curved surface) in the axial direction thereof. The non-curved surface portion 4e has a flat configuration and is thus linear in the axial section of the sliding contact member 4. By forming the non-curved surface portion 4e, a space is secured between the non-curved surface portion 4e and the curved outer circumferential surface 2a of the inner ring 2.

The space is formed as a lubricant-holding pocket 6 capable of holding the lubricant. In the case where the axial section of the curved surface 4a of the sliding contact member 4 is circular arc-shaped, it is preferable to set the distance between the non-curved surface portion 4e and the apex of the circular arc in the axial section of the sliding contact member 4 to 2 to 15% of the radius of the circular arc. By setting the above-described distance to the above-described range, it is possible to hold a necessary and sufficient amount of a lubricant. Thereby the curved surface 4a of the sliding contact member 4 is capable of stably making sliding contact with the curved outer circumferential surface 2a of the inner ring 2. In the example shown in FIG. 2, the distance between the non-curved surface portion 4e and the apex of the circular arc in the axial section of the sliding contact member 4 is set to 15% of the radius of the circular arc if the curved surface 4a of the sliding contact member 4.

In the case where the sliding contact member 4 is an injection-molded body, by setting a parting line (PL) on the non-curved surface portion 4e, the convex parting line does not interfere with the curved surface 2a which is the sliding contact surface of the inner ring 2. Therefore it is possible to omit post treatment such as abrasion of PL trace disposed at the inner circumferential side of the sliding contact member 4, which facilitates the production of the sliding contact member 4.

Figure 9:
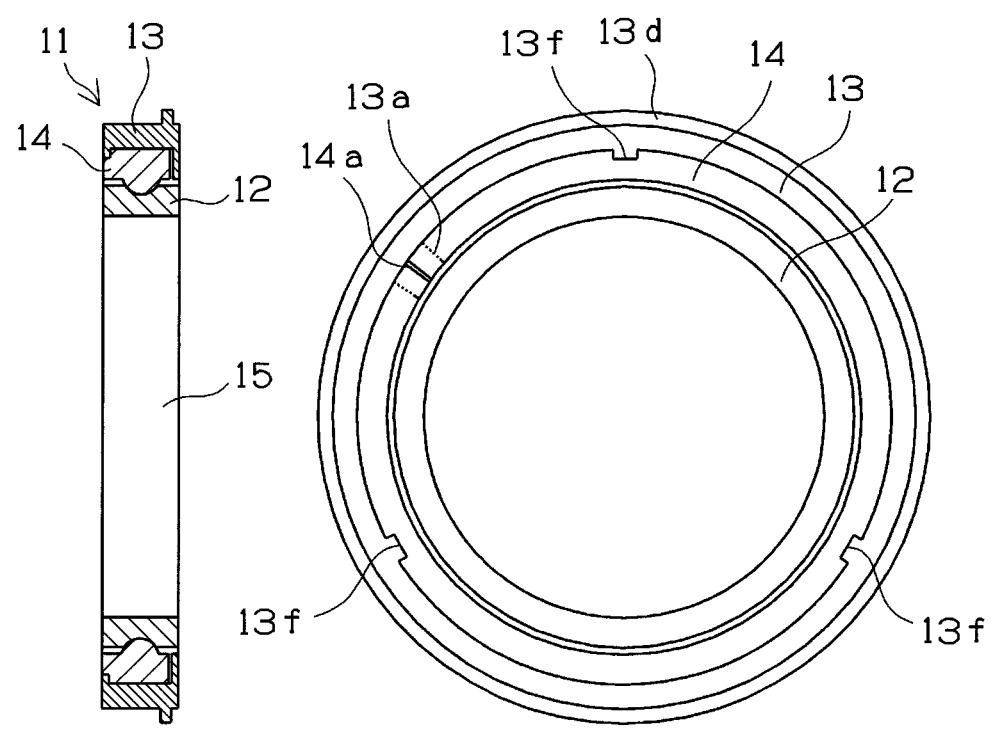
FIG. 9 is a front view showing another example of the sliding bearing of the present invention and an axial sectional view thereof.
Figure 10:
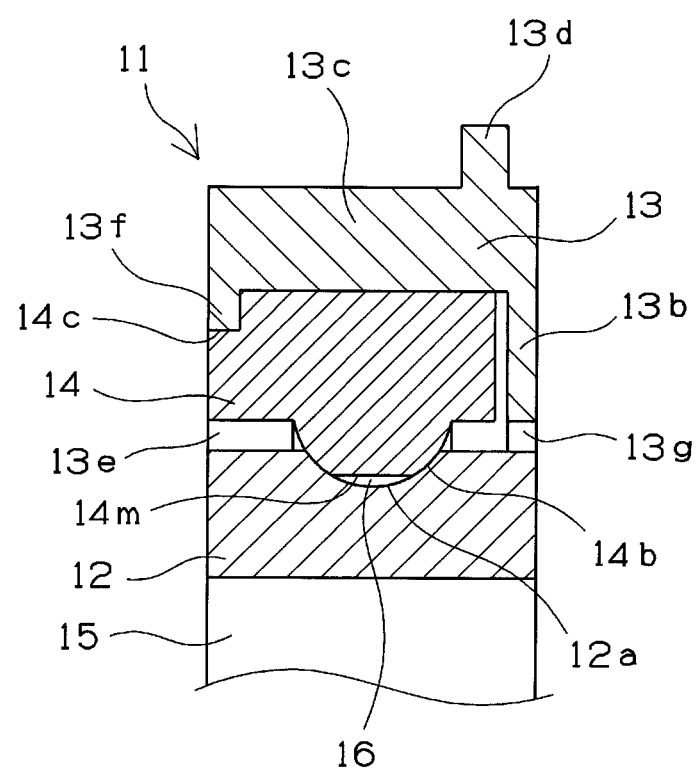
FIG. 10 is a partly enlarged view in the axial sectional view thereof in FIG. 9.

Another embodiment of the sliding bearing of the present invention is described below with reference to FIGS. 9 and 10. FIG. 9 is a front view of the sliding bearing according to another embodiment of the present invention and an axial sectional view thereof. FIG. 10 is a partly enlarged view of the axial sectional view thereof shown in FIG. 9. As shown in FIGS. 9 and 10, a sliding bearing 11 has an inner ring 12, an outer ring 13, and a sliding contact member 14 interposed between the inner ring 12 and the outer ring 13. The sliding bearing 14 is a radial bearing. The sliding contact member 14 is an annular body, formed by molding a resin composition, which has one butting portion 14a. The outer ring 3 holds the sliding contact member 14 on its inner circumferential side with the outer ring 3 covering the sliding contact member 14. A projection 13a formed on the inner circumferential surface of the outer ring 13 is fitted on the butting portion 14a of the sliding contact member 14. Owing to the fitting of the projection 13a of the outer ring 13 on the butting portion 14a of the sliding contact member 14, the outer ring 13 holds the sliding contact member 14 circumferentially unrotatably relative thereto, and in addition, the sliding contact member 14 does not hold the inner ring 12 with the sliding contact surface of the former in close contact with that of the latter.

As shown in FIG. 10, the inner ring 2 has a curved surface 12a formed along its outer circumference and a shaft-receiving hole 15 on which a supporting shaft fits on along its inner circumference. The sliding contact member 14 has on the inner circumference thereof a curved surface 14b which slidingly contacts the curved outer circumferential surface 12a of the inner ring 12 with the curved surface 14b being opposed to the curved surface 12a of the inner ring 12. The outer ring 13 is constructed of a bearing end surface 13b, a cylindrical portion 13c, and a flange 13d. A plurality of pawl portions 13f formed at the edge of an open portion 13e formed on a one end surface of the outer ring 13 is caught by a concave portion 14c formed on an end surface of the sliding contact member 14. Thereby the sliding contact member 14 is fixed to the outer ring 13.

Figure 11:
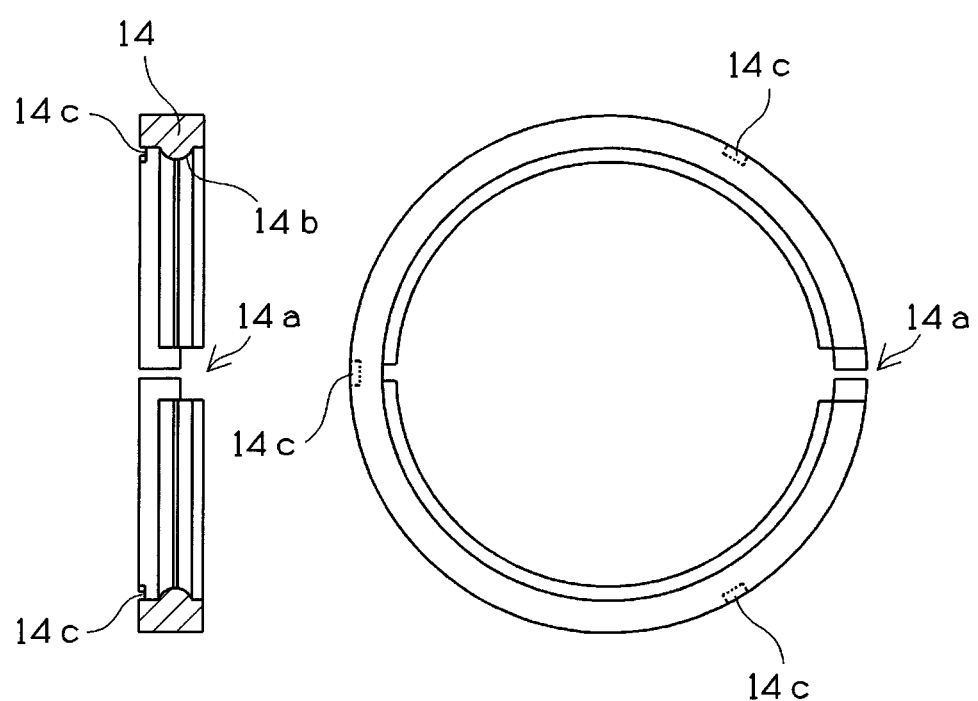
FIG. 11 is a front view of the sliding contact member of the sliding bearing shown in FIG. 9 and a sectional view thereof in its axial direction.
Figure 12:
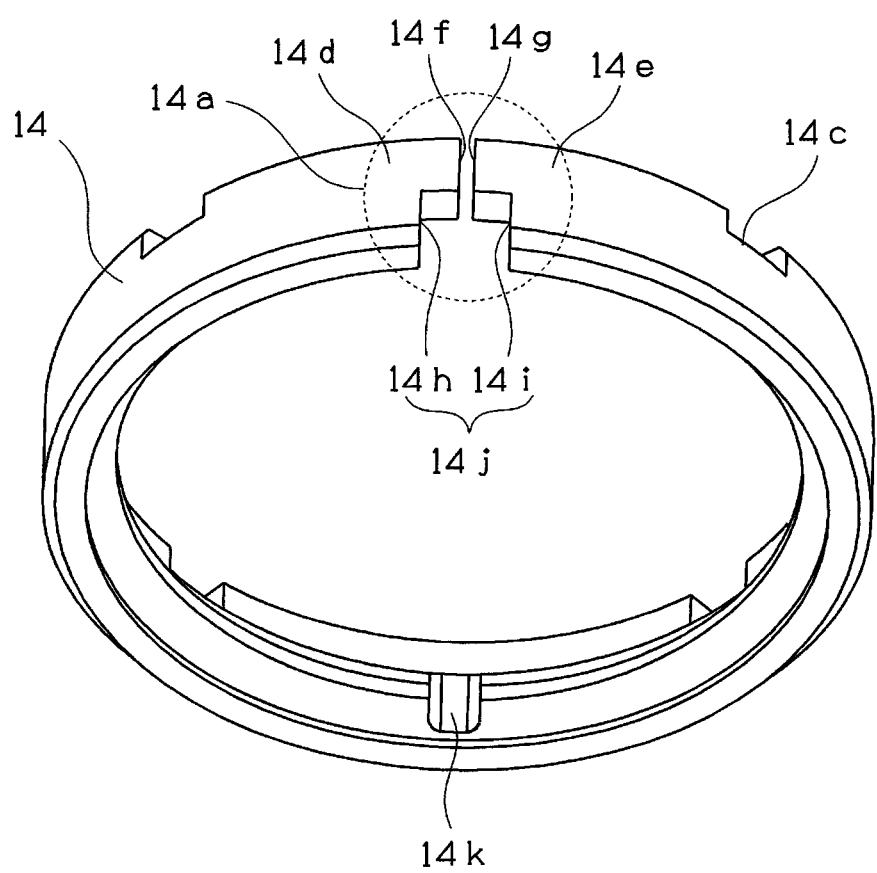
FIG. 12 is a perspective view of a sliding contact member of the sliding bearing shown in FIG. 9.

FIG. 11 is a front view of the sliding contact member and an axial sectional view thereof. FIG. 12 is a perspective view of the sliding contact member. As shown in FIG. 11, the sliding contact member 14 is an annular body having one butting portion 14a. The sliding contact member 14 has on the inner circumference thereof the curved surface 14b which slidingly contacts the curved outer circumferential surface 12a of the inner ring 12 with the curved surface 14b being opposed to the curved surface 12a of the inner ring 12. The sliding contact member 14 is made of resin. Thus in the case where the inner ring 12 is made of a metal, the linear coefficient of expansion of the sliding contact member 14 is different from that of the inner ring 12. Even in this case, because the sliding contact member 14 has the butting portion 14a formed thereon, it is possible to escape thermal expansion thereof to the butting portion 14a when the temperature is high. Therefore it is possible to prevent the sliding contact member 14 from being broken by stress concentration. In incorporating the sliding contact member 14 with the inner ring 2 by elastic deformation of the sliding contact member 14, the butting portion 14a is extended. Thus the sliding bearing is excellent in combining the inner ring 12 and the sliding contact member 14 with each other.

As shown in FIG. 12, at one side of the annular body of in its axial direction, the butting portion 14a has an abutting surface 14f disposed on a sectional surface of one end portion 14d thereof and an abutting surface 14g disposed on a sectional surface of the other end portion 14e thereof. At the other side of the annular body in its axial direction, the butting portion 14a has a stepped portion 14h disposed on the sectional surface of the one end portion 14d thereof and a stepped portion 14i disposed on the sectional surface of the other end portion 14e thereof. The stepped portions 14h and 14i fit on the projection of the outer ring 13. The projection formed on the inner circumferential surface of the outer ring 13 fits on a fit-on (hollow) portion 14j consisting of the stepped portions 14h and 14i. In the example shown in FIG. 12, although the abutting surfaces 14f and 14g and the stepped portions 14h and 14i are so formed as to divide the sectional surface of each of the end portions 14d and 14e into two approximately equal portions in the axial direction of the annular body, it is possible to increase the axial length of one of the end portions 14d and 14e as necessary. Provided that the fit-on portion 14j is so configured that the projection of the outer ring can be fitted thereon, it is possible to arbitrarily set the circumferential length of each of the stepped portions 14h and 14i or the annular body may have a form in which the stepped portion is formed at only one of the end portions 14d and 14e of the annular body.

It is preferable to form a hollow 14k at the center of a developed length of the inner circumference of the sliding contact member 14. By forming the hollow 14k, the sliding contact member 14 can be easily expanded in combining the sliding contact member 14 with the inner ring.

The sliding contact member 14 is expanded by heating it by the heat roller or the like. Because the dimension of the radius of the sliding contact member 14 is restrained by the outer ring and the housing, the developed length of the sliding contact member 14 increases owing to the expansion thereof caused by the heating. The length of the gap of the butting portion is set small so that the gap (gap of butting portion) between the abutting surfaces 14f and 14g is closed when the developed length of the sliding contact member 14 is extended owing to the expansion thereof caused by the heating. Thereby when the gap of the butting portion is closed by heating the sliding contact member 14, the sliding contact member 14 generates a compressive stress in its circumferential direction and thus creeps. Therefore the dimension of the inner diameter of the sliding contact member 14 does not change when it is cooled. Thus the sliding contact member 14 does not hold the inner ring 12 with the sliding contact surface of the former in close contact with that of the latter. Consequently the rotation torque to be applied to the sliding bearing does not fluctuate.

Figure 16:
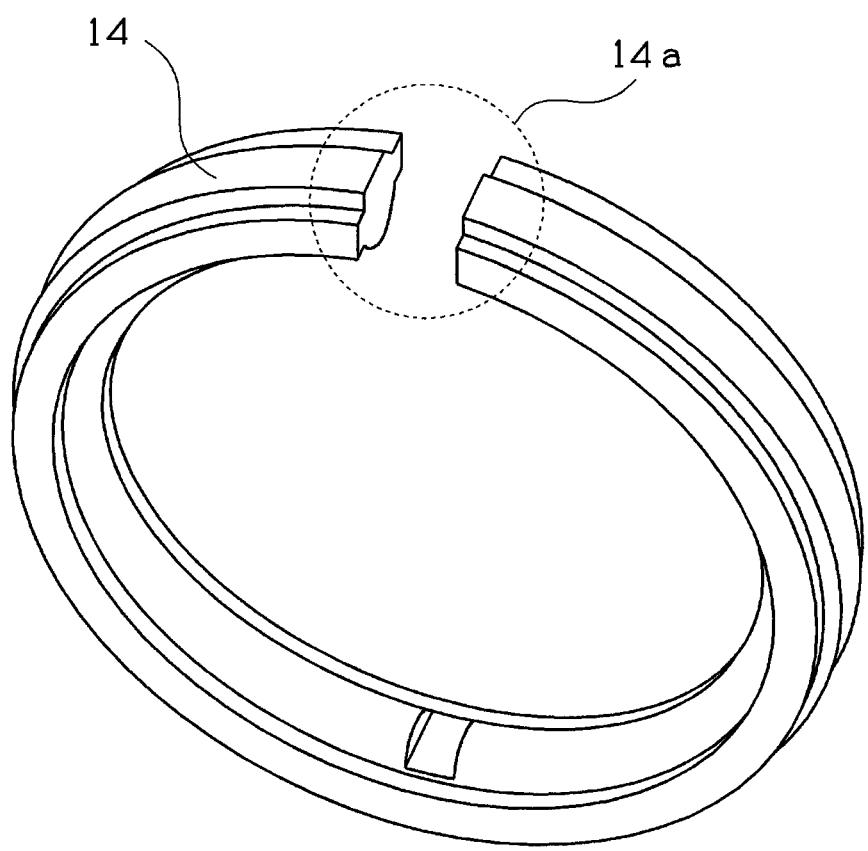
FIG. 16 is a perspective view of a sliding contact member having another mode.

The sliding contact member 14 may be formed as an annular body having the butting portion 14a, as shown in FIG. 16. In the case where the sliding contact member 14 having this configuration is used (a form in which a projection or the like is not fitted on the butting portion 14a), the sliding contact member 14 has the following problem: Normally, because the gap of the butting portion 14a is widely set, the gap of the butting portion 14a does not close, even though the developed length of the sliding contact member is extended owing to the expansion of the sliding contact member 14 caused by the heating. Therefore the sliding contact member 14 does not generate the compressive stress in its circumferential direction and thus does not creep. Because the sliding contact member 14 is heated by the heat of the heat roller, a molding stress is relaxed and thus the sliding contact member 14 deforms in a direction in which the gap of the butting portion 14a becomes short. Therefore when the sliding contact member 14 is cooled, the dimension of the inner diameter thereof changes to a low extent and thus the outer ring 14 holds the inner ring with the sliding contact surface of the former in close contact with that of the latter. As a result, a high rotation torque is applied to the sliding bearing.

Figure 19:
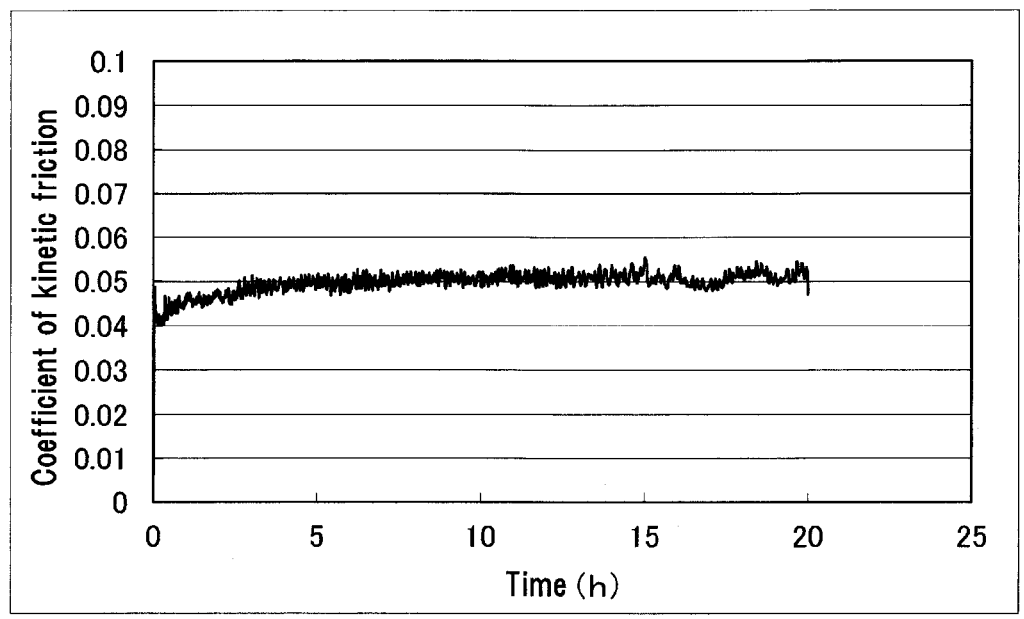
FIG. 19 shows a change of the coefficient of kinetic friction of a test sliding bearing A.
Figure 20:
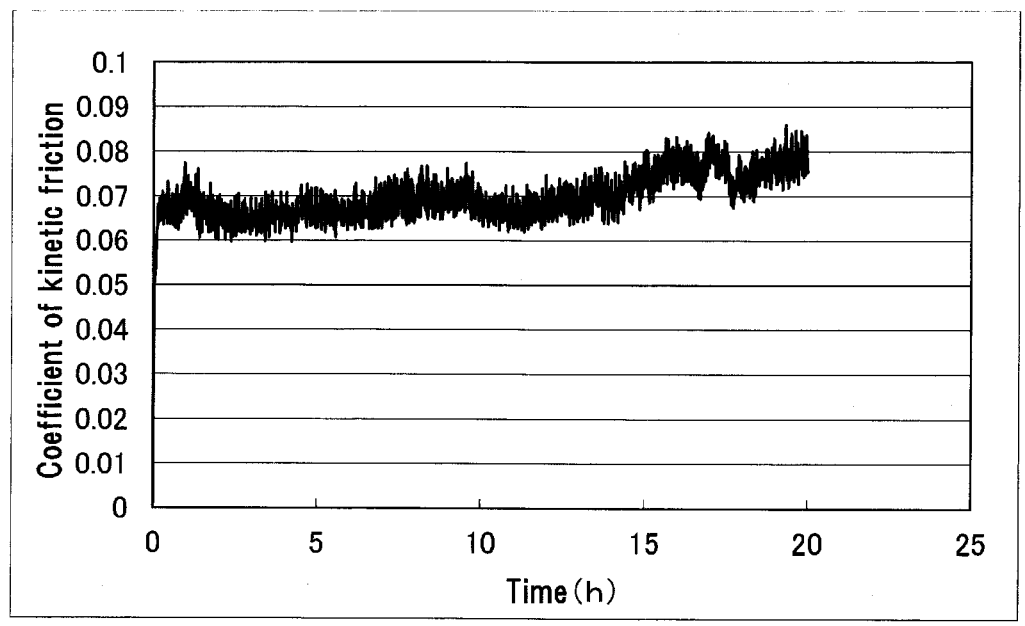
FIG. 20 shows a change of the coefficient of kinetic friction of a test sliding bearing B.

By using test sliding bearings shown in FIG. 16, the following test was conducted to examine the difference between the degree of close contact made between the sliding contact surface of the inner ring of one test sliding bearing and that of the sliding contact member thereof and the degree of close contact made between the sliding contact surface of the inner ring of the other test sliding bearing and that of the sliding contact member thereof. Two test sliding bearings A and B were produced by using a molded body (PPS resin 60+glass fiber 30 (wt %)) consisting of a PPS resin composition as the outer ring, a molded body (PPS resin 60+PTFE resin 35+graphite 5 (wt %)) consisting of the PPS resin composition as the sliding contact member, and an inner ring (material: SUJ2) for use in a thin deep groove ball bearing #6805 as the inner ring. The test sliding bearing A had a projection whose length was equal to that of the butting portion of the sliding contact member on the inner circumferential surface of its outer ring. The projection was fitted on the butting portion of the sliding contact member. The test sliding bearing B did not have a projection on the inner circumferential surface of its outer ring. By using these sliding bearings, an operation test was conducted in conditions in which the temperature was 180 degrees, the load was 1.8 MPa, the speed was 13.2 m/minute, the operation period of time was 20 hours, and the lubricant was NOXLUBE BF4023 produced by NOK KLUBER Co., Ltd to record a change of the coefficient of kinetic friction of each test sliding bearing. FIG. 19 (test sliding bearing A) and FIG. 20 (test sliding bearing B) show the results. In FIGS. 19 and 20, the axes of abscissa show the elapsed time (hour), whereas the axes of ordinate show the coefficient of kinetic friction.

As shown in FIG. 19, the coefficient of kinetic friction of the test sliding bearing A was low and maintained constantly. It is considered that the gap between the abutting surfaces was restrained by the projection of the outer ring and thus the sliding contact member did not hold the inner ring with the sliding contact surface of the former in close contact with that of the latter. On the other hand, as shown in FIG. 20, the coefficient of kinetic friction of the test sliding bearing B was high and fluctuated to a high extent. It is considered that the gap of the butting portion was not restrained and thus the sliding contact member deformed and held the inner ring with the sliding contact surface of the former in close contact with that of the latter.

In this embodiment, the evaluation test was conducted on the test sliding bearings whose butting portions had the configuration shown in FIG. 16. In this case, the gap is controlled severely, which may cause a fear that the assembling performance deteriorates. Thus in mass-producing the sliding bearing, it is preferable to use the sliding contact member having the configuration shown in FIGS. 11 and 12.

The material of the resin composition forming the sliding contact member 14 is similar to the resin composition forming the sliding contact member of the sliding bearing having the form shown in FIG. 1.

Figure 13:
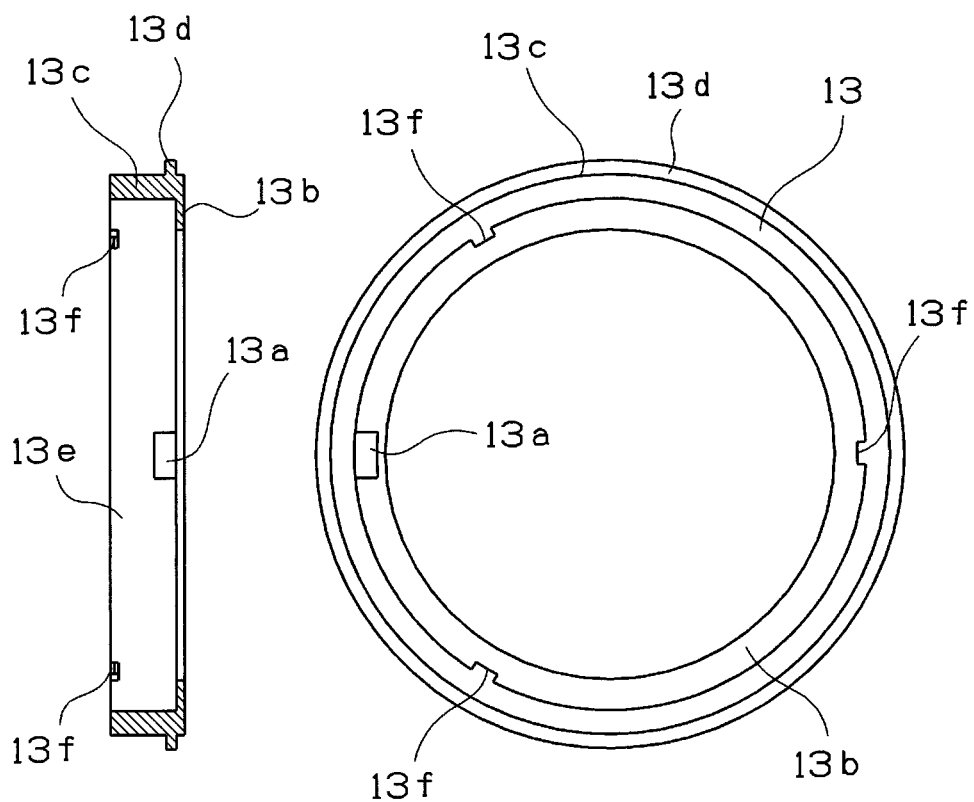
FIG. 13 is a front view of an outer ring of the sliding bearing shown in FIG. 9 and a sectional view thereof in its axial direction.

FIG. 13 shows a front view of the outer ring 13 and an axial sectional view thereof. The outer ring 13 is constructed of the bearing end surface 13b, the cylindrical portion 13c, and the flange 13d and holds the sliding contact member on its inner circumferential side with the outer ring 13 covering the sliding contact member 14. At one axial end portion of the outer ring 13, the flange 13d is formed on its entire outer circumference. The outer ring 13 has the open portion 13e formed on the axial one end surface thereof and the pawl portion 13f formed at the edge of the open portion 13e. The sliding contact member is combined with the outer ring 13 by inserting the sliding contact member thereinto from the open portion 13e and is fixed by the pawl portion 13f. By catching the pawl portion 13f on the concave portion of the sliding contact member, the sliding contact member and the outer ring 13 are integrally held. Thereby it is possible to prevent both members from being axially dislocated. The configuration of the pawl portion 13f formed at the edge of the open portion 13e of the outer ring 13 is similar to that of the outer ring of the sliding bearing having the form shown in FIG. 1.

The projection 13a to be fitted on the fit-on portion 14j (see FIG. 12) of the butting portion 14a of the sliding contact member 14 is formed on the inner circumferential surface of the outer ring 13. Because the projection 13a is fitted on the fit-on portion 14j of the sliding contact member 14, the configuration of the projection 13a and the position where the projection 13a is formed are determined according to the relationship between the fit-on portion 14j and the projection 13a.

The material of the outer ring 13 is similar to that forming the outer ring of the sliding bearing having the form shown in FIG. 1 and is not limited to a specific one. The outer ring 13 can be made of resin or a metal.

Figure 14:
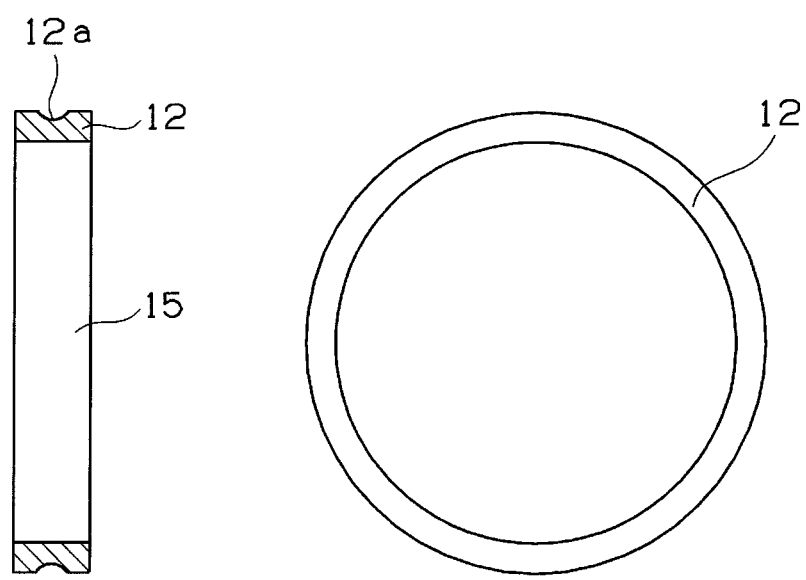
FIG. 14 is a front view of an inner ring of the sliding bearing shown in FIG. 9 and an axial sectional view thereof.

FIG. 14 is a front view of the inner ring 12 and an axial sectional view thereof. As shown in FIG. 14, the concave curved surface 12a is formed along the entire outer circumference of the inner ring 12. The curved surface 12a is a sliding contact surface which mates with that of the sliding contact member. The configuration and material of the inner ring 12 are similar to those of the inner ring of the sliding bearing having the form shown in FIG. 1.

Based on FIGS. 9 and 10, the sequence of assembling the sliding bearing is described below. Initially the sliding contact member 14 is fitted on the inner ring 12 by elastic deformation of the sliding contact member 14 with the curved surface 12a of the inner ring 12 being in contact with and opposed to the curved surface 14b of the sliding contact member 14. Thereafter the sliding contact member 14 is combined with the outer ring 13 by fitting the projection 13a formed on the inner circumferential surface of the outer ring 13 on the fit-on portion 14j (see FIG. 12) of the butting portion 14a of the sliding contact member 14 to integrate the sliding contact member 14 and the outer ring 13 with each other. In the case where a lubricant such as grease is applied to the sliding contact surfaces, it is preferable to apply the lubricant thereto in advance before combining the sliding contact member 14 and the inner ring 12 with each other.

Figure 15:
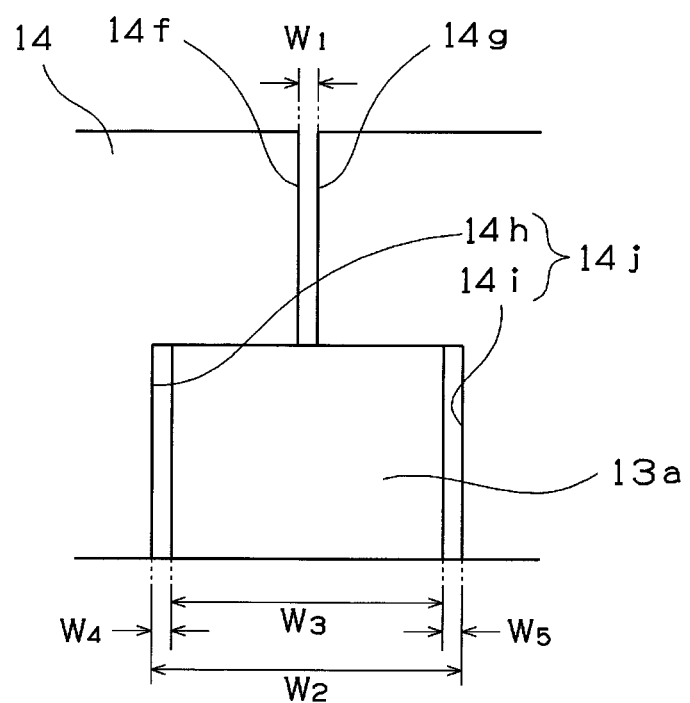
FIG. 15 shows the length of a gap of a fit-on portion where the sliding contact member is fitted on the outer ring.

Based on FIG. 15, the length of the gap in the fit-on portion is described below. FIG. 15 is an enlarged view of the fit-on portion where the projection 13a of the outer ring 13 is fitted on the butting portion 14a of the sliding contact member 14. It is preferable to set a circumferential length $W_2$ of the fit-on portion 14j consisting of the stepped portions 14h and 14i longer than a circumferential length $W_3$ of the projection 13a of the outer ring 13. That is, the length $W_2$ is not set equally to the length $W_3$. Thereby it is possible to improve the performance in combining the sliding contact member with the outer ring. On the other hand, when the circumferential length $W_2$ of the fit-on portion 14j is set much longer than the circumferential length $W_3$ of the projection 13a, there is much play between the projection 13a and the fit-on portion 14j. Thus it is preferable to set the circumferential length $W_2$ of the fit-on portion 14j slightly longer than the circumferential length $W_3$ of the projection 13a. More specifically, it is preferable to set the circumferential length $W_2$ longer than the circumferential length $W_3$ by 0.3 to 0.6 mm.

It is preferable to set a length $W_1$ of the gap between the abutting surfaces 14f and 14g (length of the gap of the butting portion) shorter than a length ($W_4+W_5$) of the gap between the fit-on portion 14j and the projection 13a. Thereby when the developed length of the sliding contact member is extended owing to the expansion thereof caused by the heating, the gap between the abutting surfaces 14f and 14g of the butting portion closes earlier than the gap between the fit-on portion 14j and the projection 13a. Thus by narrowly setting the gap of the butting portion, it is possible to prevent the sliding contact member from holding the inner ring with the sliding contact surface of the former in close contact with that of the latter. Because the gap of the butting portion is not a portion on which other member fits, it is easy to control the dimension of the gap of the butting portion and narrowly set the gap thereof. Because the gap between the abutting surfaces 14f and 14g of the butting portion closes earlier than the gap between the fit-on portion 14j and the projection 13a, the sliding contact member is prevented from holding the inner ring with the sliding contact surface of the former in close contact with that of the latter. Therefore it is unnecessary to severely control the length ($W_4+W_5$) of the gap between the fit-on portion 14j and the projection 13a. As described above, by setting the circumferential length $W_2$ of the fit-on portion 14j longer than the circumferential length $W_3$ of the projection 13a, it is possible to secure the performance of combining the sliding contact member with the outer ring and prevent the rotation torque from fluctuating without severely controlling the length of the gap.

It is preferable to set the length $W_1$ of the gap between the abutting surfaces 14f and 14g before the sliding contact member is combined with the outer ring equally to the length $W_1$ of the gap between the abutting surfaces 14f and 14g after the sliding contact member is combined with the outer ring. Thereby it is possible to allow the gap between the sliding contact member 14 and the inner ring 12 to be uniform when both members have been combined with each other and prevent the rotation torque from becoming high and fluctuating.

Based on FIG. 10, the sliding contact surface of the inner ring 12 and that of the sliding contact member 14 are described in detail below. In the sliding bearing 11, the curved surface 14a of the sliding contact member 14 and the curved outer circumferential surface 12a of the inner ring 12 are the sliding contact surfaces. Because the sliding contact member 14 is unrotatably held by the outer ring 13, the sliding contact member 14 rotates together with the outer ring 3 relative to the inner ring 2. The inner ring 2 and the sliding contact member 14 contact each other. Because the gap 13g is formed between the inner ring 12 and the outer ring 13, both members 12 and 13 do not contact each other.

In the example shown in FIG. 10, the curved outer circumferential surface 12a of the inner ring 12 is concave in its axial section, whereas the curved surface 14b of the sliding contact member 14 is convex in its axial section in correspondence to the curved outer circumferential surface 12a of the inner ring 12. In the example shown in FIG. 10, in the sliding contact member 14, a non-curved surface portion 14m is formed along the entire circumference of the central portion of the curved surface 14b (convex curved surface) in its axial direction. The non-curved surface portion 14m has a flat configuration and is thus linear in the axial section of the sliding contact member 14. A space formed between the non-curved surface portion 14m and the curved outer circumferential surface 12a of the inner ring 12 serves as a lubricant-holding pocket 16 capable of holding the lubricant. The details of the concave and convex configurations are similar to those shown in FIG. 2.

In the above-described sliding bearings having different forms, it is preferable to apply a lubricant such as lubricating oil or grease to the sliding contact surface of the inner ring and that of the sliding contact member. Because the sliding bearing of the present invention has the construction in which the sliding contact member made of resin is interposed between the inner ring and the outer ring, the sliding bearing has a low frictional property. It is possible to decrease the frictional torque to a further extent by applying the lubricant to the sliding contact surfaces. Consequently it is possible to prevent seizing of the sliding contact member and thus significantly lengthen the life of the sliding bearing. In the case where the lubricant is applied to the sliding contact surfaces, it is preferable to form the above-described lubricant-holding pocket thereon. By forming the lubricant-holding pocket, the lubricant is held therein and thus can be stably supplied to the sliding contact surfaces for a long term.

It is preferable to dispose the lubricant-holding pockets 6 and 16 on the sliding contact surface of the sliding contact members 4 and that of the sliding contact member 14 respectively, namely, on a portion of each of the curved surfaces 4a and 14b to which a load is applied. In the present invention, "the portion to which the load is applied" means the portion to which the load is applied to the highest degree. By disposing the lubricant-holding pocket to this portion which affects the lubricating property, the lubricant is effectively utilized. In the forms shown in FIGS. 2 and 10, the neighborhood of the apex of the circular arc of each of the curved surfaces 4a and 14b is the portion to which the load is applied. The lubricant-holding pockets 6 and 16 are positioned at the portion to which the load is applied.

The configuration of the lubricant-holding pocket to be formed on the sliding contact surface of the sliding contact member may be dimple (hole)-shaped or groove-shaped in addition to the non-curved surface portion, as shown in FIGS. 2 and 10. The lubricant-holding pocket may be formed in combination of the non-curved surface portion, the dimple, and the groove. It is possible to form a desired number of the dimples and the grooves. The groove may be formed axially or circumferentially. It is preferable to set the width of the groove to 0.1 to 5% of the inner circumference of the sliding contact member 14. In the case where the axial section of the curved surface of the sliding contact member is circular arc-shaped, it is preferable to set the depth of the groove to 5 to 100% of the radius of the circular arc of the curved surface. It is preferable to set the diameter of the dimple to 1 to 80% of the axial length of the curved surface of the sliding contact member. In the case where the axial section of the curved surface of the sliding contact member is circular arc-shaped, it is preferable to set the depth of the dimple to 5 to 100% of the radius of the circular arc. In the case of the sliding bearing having the form shown in FIG. 1, as shown in FIG. 4, a groove 4g is axially formed at a portion opposed to the position of the butting portion 4f of the sliding contact member 4. In this case, the lubricant-holding pocket includes the groove 4g.

Figure 7:
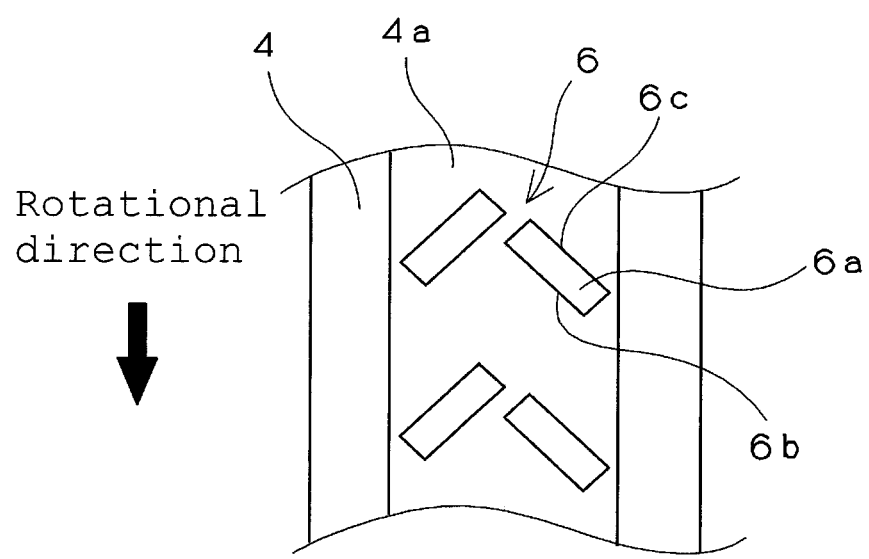
FIG. 7 is a partly enlarged view of an inner circumferential surface of a sliding contact member where a groove-shaped lubricant-holding pocket having another form is formed.

FIG. 7 is a partly enlarged view of the inner circumferential surface of the sliding contact member where a groove-shaped lubricant-holding pocket having a form different from the above-described one is formed. The lubricant-holding pocket shown in FIG. 7 is constructed of a plurality of two-row rectangular grooves 6a formed on the entire circumference of the curved surface 4a of the inner circumference of the sliding contact member 4. Two grooves 6a arranged side by side has the shape of a katakana character "ハ". The lower side of the katakana character "ハ" is so formed as to face the rotational direction of the sliding contact member 4. When the sliding contact member 4 rotates, the lubricant enclosed between the sliding contact member 4 and the inner ring moves with the lubricant being gathered toward the upper side of the katakana character "ハ" from the lower side thereof. Because the upper side of the katakana character "ハ" is positioned at a central portion of the curved surface 4a of the sliding contact member 4 in the width direction thereof, the lubricant moves to the central portion of the curved surface 4a of the sliding contact member in its width direction when the sliding contact member 4 rotates. That "when the sliding contact member 4 rotates" means the time when the sliding contact member 4 rotates relative to the inner ring 2 and includes the time when the sliding contact member 4 is fixed and the inner ring 2 rotates.

It is preferable to form each groove 6a as an inclined groove in which the groove 6a becomes deeper from a rectangular side 6b of the groove 6a at the rotational direction side of the sliding contact member 4 toward a side 6c thereof opposed to the rectangular side 6b thereof. By forming the groove 6a deeper from the rotational direction side of the sliding contact member 4 toward the opposite side thereof, the lubricant can be collected easily as compared with a case in which the groove 6a is not inclined, when the sliding contact member 4 rotates.

By forming the lubricant-holding pocket having the above-described form on the sliding contact surface of the sliding contact member, a film consisting of the lubricant is easily and continuously formed at the widthwise central portion of the sliding bearing where a load is applied to the sliding bearing to the highest extent. Thereby it is possible to obtain a rotation which is smooth with a low frictional torque being applied to the sliding bearing. By appropriately selecting the dimple and the groove in consideration of a situation in which the load is applied to the sliding bearing and the lubrication properties based on the number of rotations of the sliding bearing when the sliding bearing is operated and determining the size of the dimple and the groove, the position where they are disposed, and the number thereof, it is possible to hold the lubricant in the lubricant-holding pocket sufficiently and without waste. Although there is a case in which abrasion powder is generated because the sliding contact member is made of resin and the sliding contact member and the inner ring slidingly contact each other, the lubricant-holding pocket is capable of accommodating the generated abrasion powder. Therefore it is possible to allow the sliding bearing to rotate at a low frictional torque.

In the sliding bearing of the present invention, as grease which is a lubricant to be applied to the sliding contact surface of the inner ring and that of the sliding contact member, it is possible to use grease to be normally used for the sliding bearing without limitation. For example, it is possible to list mineral oil such as paraffin-based mineral oil and naphthene-based mineral oil; hydrocarbon-based synthetic oil such as polybutene oil, poly-α olefin oil, alkylbenzene oil, alkylnaphthalene oil, alicyclic compounds; and non-hydrocarbon-based synthetic oil such as natural fat and oil, polyol ester oil, phosphate ester, diester oil, polyglycol oil, silicone oil, polyphenyl ether oil, alkyldiphenyl ether oil, and fluorinated oil. These base oils may be used singly or in combination of not less than two kinds thereof.

As a thickener for the grease, it is possible to list metal soap-based thickener such as aluminum soap, lithium soap, sodium soap, lithium complex soap, calcium complex soap, and aluminum complex soap; urea compounds such as a diurea compound and a polyurea compound; and fluororesin powder such as PTFE resin. These thickeners may be used singly or in combination of not less than two kinds thereof.

Because the sliding bearing of the present invention is used to support the fixing roller and the like mounted on an image-forming apparatus and operated at high temperatures, the grease is also required to have heat resistance. Thus of the above-described greases, it is preferable to use fluorine grease composed of fluorinated oil serving as its base oil and fluororesin powder serving as its thickener or urea grease containing a urea compound serving as its thickener. It is possible to use grease consisting of a mixture of the fluorine grease and the urea grease. The above-described grease is capable of containing known additives as necessary.

EXAMPLES

Example 1

Figure 18:
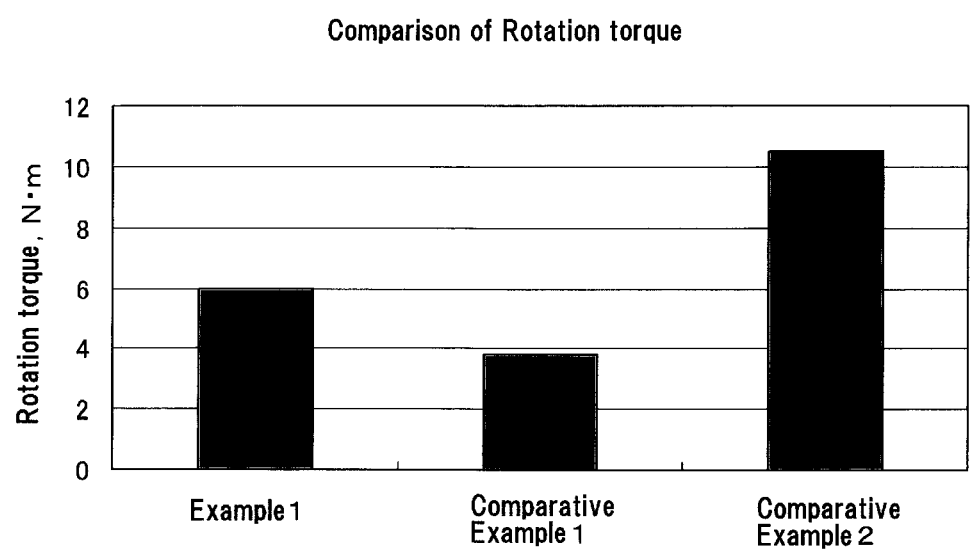
FIG. 18 shows a bar graph showing results of a rotation torque comparison test.

A sliding contact member which had a configuration (had the non-curved surface portion 4e, the butting portion 4f, and the groove 4g) shown in FIG. 4 was produced by injection-molding BEAREE AS5056 (PPS resin composition (containing PTFE resin and graphite)) produced by NTN Engineering Plastics Corporation, which is a sliding bearing material for a fixing roller. The outer ring having a configuration shown in FIG. 5 was produced by injection-molding BEAREE AS5040 (PPS resin composition (containing glass fiber)) produced by NTN Engineering Plastics Corporation. An inner ring of a ball bearing 6805 was divertingly used as the inner ring. By using the sliding contact member, the outer ring, and the inner ring obtained in this manner, sliding bearings which had a construction shown in FIG. 2 and an external dimension designed equally to that of a ball bearing 6805ZZ provided with a locating snap ring for a fixing roller produced by NTN Corporation. In detail, initially the fluorine grease (NOXLUB BF4023 produced by NOK KLUBER Co., Ltd.) was uniformly applied (about 5 g) to the curved surface of the outer circumference of the inner ring. The sliding contact member was combined with the inner ring. Thereafter the sliding contact member combined with the inner ring was combined with the outer ring by catching the sliding contact member on the pawl portion of the outer ring. The obtained sliding bearings were subjected to a rotation torque test shown below to determine the rotation torque thereof. FIG. 18 shows the results. Table 1 shows overall judgment made in consideration of the production cost.

<Rotation Torque Test>

Figure 17:
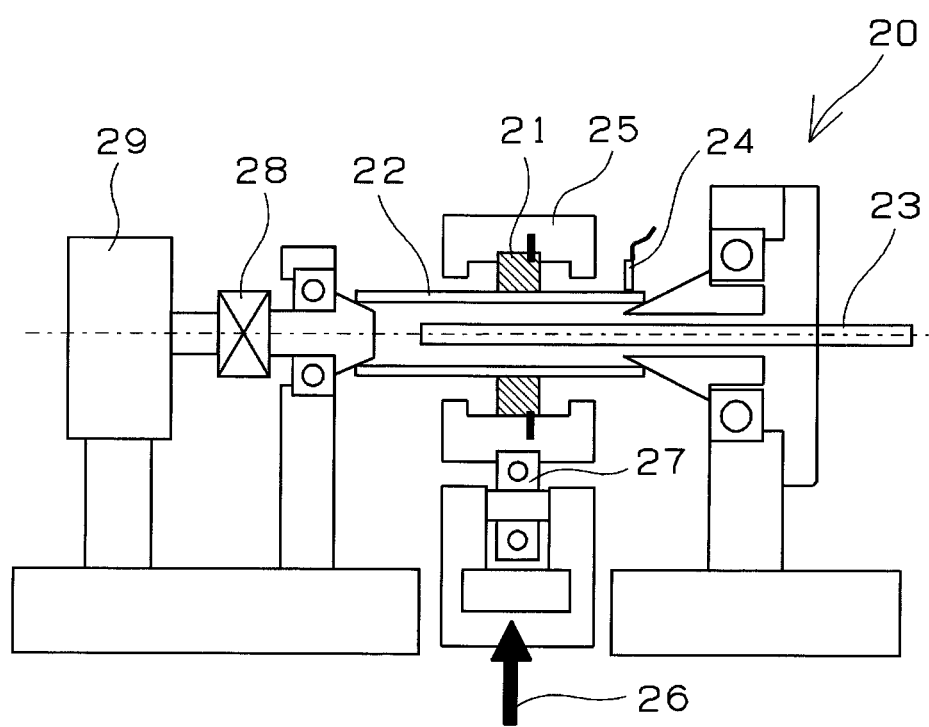
FIG. 17 is a schematic view of a shaft-heating high temperature radial tester.

By using a shaft-heating high temperature radial tester 20 shown in FIG. 17, the rotation torque of a test bearing 21 was measured. The shaft-heating high temperature radial tester 20 is used to heat a fixing roller 22 which is an imitation of a fixing roller of a fixing device of a copying machine from its inner diameter by using a cartridge heater 23 and control the surface temperature of the fixing roller 22 to obtain a predetermined temperature by using a thermocouple 24. In the test, after the test bearing 21 was mounted inside a housing 25, the fixing roller 22 was inserted into the inside diameter of the inner ring of the test bearing 21. After the test bearing 21 was pressed upward from a lower portion of the housing 25 via a ball bearing 27, a load 26 of 200N was applied thereto. A turned product (surface roughness Ra: 0.5 to 0.7 µm) made of aluminum (A5052) was used as the material of the fixing roller. The number of rotations of the fixing roller 22 was 230 rpm. The surface temperature of the fixing roller 22 was 180° C. The test period of time was 20 hours. A dry lubricant was used for the test bearing of a comparative example 2. In this state, the fixing roller 22 was rotated by a driving motor 29 via a coupling 28. The rotation torque of the test bearing 21 was computed by measuring the rotational force of the housing 25 rotating together with the test bearing 21 by a load cell (not shown).

<Production Cost>

In table 1, the production costs (computed cost) of the test bearings are shown in numerals relative to 100 which was the production cost of the test bearing of the example 1.

<Overall Judgment>

In consideration of the result of the rotation torque test shown in FIG. 18 and the production cost shown in table 1, test bearing not inferior in its rotation torque and computed cost was synthetically judged that it was good in the balance between the rotation torque and the computed cost and was marked by "o", whereas test bearings inferior in the rotation torque and/or computed cost thereof were comprehensively judged that they were bad in the balance between the rotation torque and computed cost thereof and were marked by "x", Comparative Example 1

By using the ball bearing 6805ZZ provided with locating snap ring for the fixing roller produced by NTN Corporation as the test bearing, a test and evaluation similar to those of the example 1 were conducted. The result is shown in FIG. 18 and table 1.

Comparative Example 2

A test and evaluation similar to those of the example 1 were conducted on a sliding bearing produced by injection-molding the BEAREE AS5056 produced by NTN Engineering Plastics Corporation, which had a dimension equal to that of the ball bearing for the fixing roller: 6805ZZ provided with locating snap ring, produced by NTN Corporation. The result is shown in FIG. 18 and table 1.

TABLE 1

|  | Example | Comparative example | |
| --- | --- | --- | --- |
|  | 1 | 1 | 2 |
| Computed cost | 100 | 200 | 50 |
| Overall judgment | ◯ | X | X |

As a result of the comparative test of the rotation torque, it was confirmed that although the sliding bearing of the example 1 had a little larger rotation torque than the ball bearing of the comparative example 1, the sliding bearing of the example 1 had a much smaller rotation torque than the sliding bearing of the comparative example 2. As apparent from table 1, it was confirmed that the sliding bearing of the example 1 was comprehensively superior to the ball bearing and the conventional sliding bearing.

INDUSTRIAL APPLICABILITY

The sliding bearing of the present invention has a low frictional torque and self-thermal insulation effectiveness. The sliding bearing has a smaller number of parts and a simpler construction than the ball bearing, can be produced easily, and has a property intermediate between that of the ball bearing and that of the conventional sliding bearing made of resin in both the frictional torque and production cost thereof. Therefore the sliding bearing of the present invention can be preferably utilized to support the heat roller such as a heating roller and a pressure roller of a fixing device of an image-forming apparatus such as a copying machine, a printer, a facsimile, and the like.

EXPLANATION OF REFERENCE NUMERALS AND SYMBOLS

1: sliding bearing
2: inner ring
2a: curved surface
3: outer ring
3a: pawl portion
3b: end surface side inner surface
3c: inner circumferential surface
3d: open portion
3e: flange
3f: gap
3g: rotation-stopping portion
4: sliding contact member
4a: curved surface
4b: one end surface
4c: other end surface
4d: outer circumferential surface
4e: non-curved surface portion
4f: butting portion
4g: groove
5: shaft-receiving hole
6: lubricant-holding pocket
6a: groove
6b: rectangular side
6c: opposed side
11: sliding bearing
12: inner ring
12a: curved surface of inner ring
13: outer ring
13a: projection
13b: bearing end surface
13c: cylindrical portion
13d: flange
13e: open portion
13f: pawl portion
13g: gap
14: sliding contact member
14a: butting portion
14b: curved surface of sliding contact member
14c: concave portion
14d: end of annular body
14e: end of annular body
14f: abutting surface (14d side)
14g: abutting surface (14e side)
14h: stepped portion (14d side)
14i: stepped portion (14e side)
14j: fit-on portion
14k: hollow
15: shaft-receiving hole
16: lubricant-holding pocket
20: shaft-heating high temperature radial tester
21: bearing test
22: fixing roller
23: cartridge heater
24: thermocouple
25: housing
26: load
27: ball bearing
28: coupling
29: driving motor

The invention claimed is:

1. A sliding bearing comprising an inner ring, an outer ring, and a sliding contact member interposed therebetween,
   wherein said inner ring has a curved outer circumferential surface formed along an outer circumference thereof and a shaft-receiving hole which fits on a supporting shaft along an inner circumference thereof;
   said sliding contact member is a molded body, made of a resin composition, which has a curved surface making sliding contact with said curved outer circumferential surface of said inner ring with said curved surface of said sliding contact member being opposed to said curved outer circumferential surface of said inner ring;
   said sliding contact member is elastically deformable and is fitted on said inner ring by an elastic deformation of said sliding contact member; and
   said outer ring does not contact said inner ring and holds said sliding contact member on an inner circumferential side thereof with said outer ring covering said sliding contact member.

2. A sliding bearing according to claim 1, wherein said sliding contact member is an annular body having a first end portion and a second end portion and one butting portion which is a disconnected portion.

3. A sliding bearing according to claim 2, wherein said outer ring has a projection on an inner circumferential surface thereof; and said projection is fitted on said butting portion of said sliding contact member.

4. A sliding bearing according to claim 3, wherein said annular body is so constructed that at one side of said annular body in an axial direction thereof, said butting portion has an abutting surface disposed on a sectional surface of each, of said first and said second end portions, of said annular body; and at an opposite side of said annular body in said axial direction thereof, said butting portion has a stepped portion on which said projection of said outer ring fits on said sectional surface of at least one of said first and second end portions of said annular body.

5. A sliding bearing according to claim 4, wherein a circumferential length of a fit-on portion, consisting of said stepped portions, on which said projection of said outer ring fits is set longer than a circumferential length of said projection of said outer ring.

6. A sliding bearing according to claim 4, wherein, a length of a gap between said each abutting surface of said first and said second end portions of said annular body, is set shorter than a length of a gap between a fit-on portion, consisting of said stepped portions, and said projection of said outer ring.

7. A sliding bearing according to claim 4, wherein said length of said gap between said each abutting surface of said first and said second end portions, of said annular body, before said sliding contact member is combined with said outer ring, is set equally to said length of said gap between said abutting surfaces after said sliding contact member is combined with said outer ring.

8. A sliding bearing according to claim 1, wherein a base resin of a resin composition forming said sliding contact member is at least one synthetic resin selected from among polyphenylene sulfide resin, polyether ether ketone resin, polyamideimide resin, and polyimide resin.

9. A sliding bearing according to claim 8, wherein said resin composition forming said sliding contact member contains at least one substance selected from among a solid lubricant and a fibrous reinforcing material, said solid lubricant is at least one substance selected from among polytetrafluoroethylene resin, graphite, and molybdenum disulfide, and said fibrous reinforcing material is at least one fiber selected from among carbon fibers and aramid fibers.

10. A sliding bearing according to claim 1, wherein said outer ring is a molded body of a resin composition.

11. A sliding bearing according to claim 10, wherein a base resin of a resin composition forming said sliding contact member is at least one synthetic resin selected from among polyphenylene sulfide resin, polyether ether ketone resin, polyamideimide resin, and polyimide resin.

12. A sliding bearing according to claim 11, wherein said resin composition forming said outer ring contains a fibrous reinforcing material; and said fibrous reinforcing material is at least one selected from among carbon fibers; glass fibers, and aramid fibers.

13. A sliding bearing according to claim 1, wherein said outer ring has a flange formed along an outer circumference thereof.

14. A sliding bearing according to claim 1, wherein at least one lubricant selected from among fluorine grease and urea grease is applied to a sliding contact surface of said inner ring and that of said sliding contact member.

15. A sliding bearing according to claim 14, wherein a lubricant-holding pocket is formed on a sliding contact surface of said sliding contact member.

16. A sliding bearing comprising an inner ring, an outer ring, and a sliding contact member interposed therebetween, wherein said inner ring has a curved outer circumferential surface formed along an outer circumference thereof and a shaft-receiving hole which fits on a supporting shaft along an inner circumference thereof;

said sliding contact member is a molded body, made of a resin composition, which has a curved surface making sliding contact with said curved outer circumferential surface of said inner ring with said curved surface of said sliding contact member being opposed to said curved outer circumferential surface of said inner ring;

said sliding contact member is fitted on said inner ring by an elastic deformation of said sliding contact member; and said outer ring does not contact said inner ring and holds said sliding contact member on an inner circumferential side thereof with said outer ring covering said sliding contact member, wherein said outer ring has an open portion formed on an axial one end surface thereof and a pawl portion formed at an edge of said open portion; and said sliding contact member is combined with said outer ring by inserting said sliding contact member into said outer ring from said open portion thereof and fixed by said pawl portion.

17. A sliding bearing comprising an inner ring, an outer ring, and a sliding contact member interposed therebetween, wherein said inner ring has a curved outer circumferential surface formed along an outer circumference thereof and a shaft-receiving hole which fits on a supporting shaft along an inner circumference thereof;

said sliding contact member is a molded body, made of a resin composition, which has a curved surface making sliding contact with said curved outer circumferential surface of said inner ring with said curved surface of said sliding contact member being opposed to said curved outer circumferential surface of said inner ring; and said outer ring does not contact said inner ring and holds said sliding contact member on an inner circumferential side thereof with said outer ring covering said sliding contact member, wherein said curved outer circumferential surface of said inner ring is formed as a concave curved surface; and said curved surface of said sliding contact member is formed as a convex surface; and wherein a non-curved surface portion is formed along an entire circumference of a central portion of said convex curved surface of said sliding contact member in an axial direction thereof.

18. A sliding bearing according to claim 17, wherein said sliding contact member is an injection-molded body of said resin composition; and a parting line is formed on said non-curved surface portion when said resin composition is injection-molded.

19. A sliding bearing according to claim 1, wherein an inner ring for a ball bearing is used as said inner ring.

* * * * *